United States Patent [19]

Hirayama et al.

[11] Patent Number: 5,675,695
[45] Date of Patent: Oct. 7, 1997

[54] MULTI-SCENE RECORDING MEDIUM AND APPARATUS FOR REPRODUCING DATA THEREFROM

[75] Inventors: Koichi Hirayama, Yokohama; Masatoshi Nakai, Kawasaki; Kenji Shimoda, Yokohama, all of Japan

[73] Assignee: Kabushiki Kaisha Toshiba, Kawashiki, Japan

[21] Appl. No.: 628,186

[22] Filed: Apr. 5, 1996

Related U.S. Application Data

[62] Division of Ser. No. 454,289, Jun. 15, 1995, Pat. No. 5,630,006.

[51] Int. Cl.$^6$ .............................. H04N 5/91; H04N 5/928
[52] U.S. Cl. .............................. 386/95; 386/106
[58] Field of Search .................. 386/95, 46, 52, 386/53, 82, 81, 106, 124, 4; 360/13; H04N 5/91, 5/928

[56] References Cited

U.S. PATENT DOCUMENTS

| | | | |
|---|---|---|---|
| 4,305,131 | 12/1981 | Best | 364/521 |
| 4,317,131 | 2/1982 | Jerome . | |
| 4,353,090 | 10/1982 | Broadbent . | |

(List continued on next page.)

FOREIGN PATENT DOCUMENTS

| | | |
|---|---|---|
| 60-231972 | 11/1985 | Japan . |
| 63-58690 | 3/1988 | Japan . |
| 63-275071 | 11/1988 | Japan . |
| 1-32589 | 2/1989 | Japan . |
| 1-221072 | 9/1989 | Japan . |
| 1-241083 | 9/1989 | Japan . |
| 1-273275 | 11/1989 | Japan . |
| 1-314080 | 12/1989 | Japan . |
| 2-89666 | 7/1990 | Japan . |
| 2-202766 | 8/1990 | Japan . |
| 2-276071 | 11/1990 | Japan . |
| 2-287990 | 11/1990 | Japan . |
| 3-134883 | 6/1991 | Japan . |
| 3-207056 | 9/1991 | Japan . |
| 3-220671 | 9/1991 | Japan . |
| 3-250463 | 11/1991 | Japan . |
| 3-293873 | 12/1991 | Japan . |
| 4-13287 | 1/1992 | Japan . |
| 4-28056 | 1/1992 | Japan . |
| 4-40770 | 2/1992 | Japan . |
| 4-307884 | 10/1992 | Japan . |
| 4-324165 | 11/1992 | Japan . |
| 4-332969 | 11/1992 | Japan . |
| 5-12804 | 1/1993 | Japan . |
| 5-12831 | 1/1993 | Japan . |
| 5-176290 | 7/1993 | Japan . |
| 5-189872 | 7/1993 | Japan . |
| 5-342748 | 12/1993 | Japan . |
| 6-189218 | 7/1994 | Japan . |
| 6-309841 | 11/1994 | Japan . |
| 7-130102 | 5/1995 | Japan . |
| 7-134892 | 5/1995 | Japan . |
| 7-141844 | 6/1995 | Japan . |
| 7-168855 | 7/1995 | Japan . |
| 7-176175 | 7/1995 | Japan . |
| 2-157122 | 10/1985 | United Kingdom . |

Primary Examiner—Robert Chevalier
Attorney, Agent, or Firm—Cushman Darby & Cushman IP Group of Pillsbury Madison & Sutro, LLP

[57] ABSTRACT

A multi-scene recording disk and a data reproducing apparatus, which enables a user to select and enjoy one of simultaneously proceeding scenes, and also enables a program editor to edit programs using a new concept and novel fashion. Related program movements, each consisting of program bars, are recorded on the disk 100. The data reproducing apparatus includes a data string processing section 203, a system control section 204, an operator panel 205, a video processing section 206, and audio processing sections 211 and 213. The sections 203 and 204 and the panel 205 select any one of the program movements, and switch one movement to another, and select any one of the program bars of the movement selected and switch one bar to another. The information thus selected is supplied to the video processing section 206 and the audio processing sections 211 and 213.

6 Claims, 22 Drawing Sheets

U.S. PATENT DOCUMENTS

| | | |
|---|---|---|
| 4,433,347 | 2/1984 | Sugiyama et al. . |
| 4,490,752 | 12/1984 | Machida et al. . |
| 4,510,531 | 4/1985 | Sugiyama . |
| 4,519,008 | 5/1985 | Takenouchi et al. . |
| 4,542,419 | 9/1985 | Morio et al. . |
| 4,551,771 | 11/1985 | Machida et al. . |
| 4,563,709 | 1/1986 | Hirata . |
| 4,583,132 | 4/1986 | Nakano et al. . |
| 4,602,295 | 7/1986 | Moriyama et al. . |
| 4,604,655 | 8/1986 | Moriyama . |
| 4,613,908 | 9/1986 | Takahashi et al. . |
| 4,614,979 | 9/1986 | Sugiyama et al. . |
| 4,614,982 | 9/1986 | Ibaraki . |
| 4,641,204 | 2/1987 | Sugiyama . |
| 4,642,703 | 2/1987 | Endo . |
| 4,647,985 | 3/1987 | Yokosawa . |
| 4,656,528 | 4/1987 | Shichijo et al. . |
| 4,660,099 | 4/1987 | Sugiyama et al. . |
| 4,669,070 | 5/1987 | Bell . |
| 4,685,098 | 8/1987 | Yoshida . |
| 4,703,369 | 10/1987 | Moriyama et al. . |
| 4,709,277 | 11/1987 | Ninomiya et al. . |
| 4,736,258 | 4/1988 | Noble et al. . |
| 4,752,832 | 6/1988 | Higurashi . |
| 4,752,835 | 6/1988 | Sou . |
| 4,768,104 | 8/1988 | Kanamaru . |
| 4,768,106 | 8/1988 | Ito et al. . |
| 4,774,596 | 9/1988 | Hashimoto . |
| 4,792,861 | 12/1988 | Kawase . |
| 4,800,446 | 1/1989 | Kanamaru . |
| 4,802,018 | 1/1989 | Tanikawa et al. . |
| 4,814,897 | 3/1989 | Kojima et al. . |
| 4,849,827 | 7/1989 | Hashimoto et al. . |
| 4,849,828 | 7/1989 | Yasuda et al. . |
| 4,858,024 | 8/1989 | Kanamaru . |
| 4,868,678 | 9/1989 | Kawase et al. . |
| 4,872,068 | 10/1989 | Ishii et al. . |
| 4,893,193 | 1/1990 | Nakamura et al. . |
| 4,905,077 | 2/1990 | Ishii . |
| 4,914,523 | 4/1990 | Maruta . |
| 4,916,553 | 4/1990 | Yoshioka et al. . |
| 4,916,683 | 4/1990 | Mizokami et al. . |
| 4,920,424 | 4/1990 | Hosaka et al. . |
| 4,947,265 | 8/1990 | Hayashi et al. . |
| 4,951,155 | 8/1990 | Andrews . |
| 4,956,725 | 9/1990 | Kozuki et al. . |
| 4,970,602 | 11/1990 | Yoshio . |
| 4,989,097 | 1/1991 | Yoshio et al. . |
| 5,010,417 | 4/1991 | Yoshio et al. . |
| 5,016,113 | 5/1991 | Yamashita et al. . |
| 5,043,826 | 8/1991 | Yoshio et al. . |
| 5,043,830 | 8/1991 | Nobuhiro . |
| 5,063,551 | 11/1991 | Yoshio et al. . |
| 5,065,252 | 11/1991 | Yoshio et al. . |
| 5,068,733 | 11/1991 | Bennett . |
| 5,089,899 | 2/1992 | Nomura et al. . |
| 5,097,349 | 3/1992 | Nomura et al. . |
| 5,107,343 | 4/1992 | Kawai . |
| 5,126,851 | 6/1992 | Yoshimura et al. . |
| 5,130,816 | 7/1992 | Yoshio . |
| 5,132,807 | 7/1992 | Takimoto et al. . |
| 5,136,394 | 8/1992 | Haikawa et al. . |
| 5,172,111 | 12/1992 | Olivo, Jr. . |
| 5,175,631 | 12/1992 | Juri et al. . |
| 5,177,645 | 1/1993 | Lemelson . |
| 5,191,436 | 3/1993 | Yonemitsu . |
| 5,206,929 | 4/1993 | Langford et al. . |
| 5,221,965 | 6/1993 | Okino . |
| 5,233,438 | 8/1993 | Funahashi et al. . |
| 5,241,399 | 8/1993 | Kanamaru . |
| 5,253,120 | 10/1993 | Endoh . |
| 5,257,253 | 10/1993 | Otsubo et al. . |
| 5,270,828 | 12/1993 | Mogi . |
| 5,282,049 | 1/1994 | Hatakenaka et al. . |
| 5,282,186 | 1/1994 | Yoshio et al. . |
| 5,287,226 | 2/1994 | Sato et al. . |
| 5,289,288 | 2/1994 | Silverman et al. . |
| 5,294,997 | 3/1994 | Ogura et al. . |
| 5,295,024 | 3/1994 | Adachi . |
| 5,315,400 | 5/1994 | Kurata et al. . |
| 5,315,570 | 5/1994 | Miura et al. . |
| 5,327,406 | 7/1994 | Sako . |
| 5,371,602 | 12/1994 | Tsuboi et al. . |
| 5,400,077 | 3/1995 | Cookson et al. . |
| 5,400,305 | 3/1995 | Sadanaka . |
| 5,400,315 | 3/1995 | Koishi et al. . |
| 5,406,381 | 4/1995 | Han . |
| 5,412,514 | 5/1995 | Kobayashi . |
| 5,420,690 | 5/1995 | Koishi . |
| 5,420,839 | 5/1995 | Tateishi . |
| 5,424,850 | 6/1995 | Inoue et al. . |
| 5,434,678 | 7/1995 | Abecassis . |
| 5,434,829 | 7/1995 | Maeda et al. . |
| 5,440,529 | 8/1995 | Takezawa et al. . |
| 5,442,456 | 8/1995 | Hansen . |

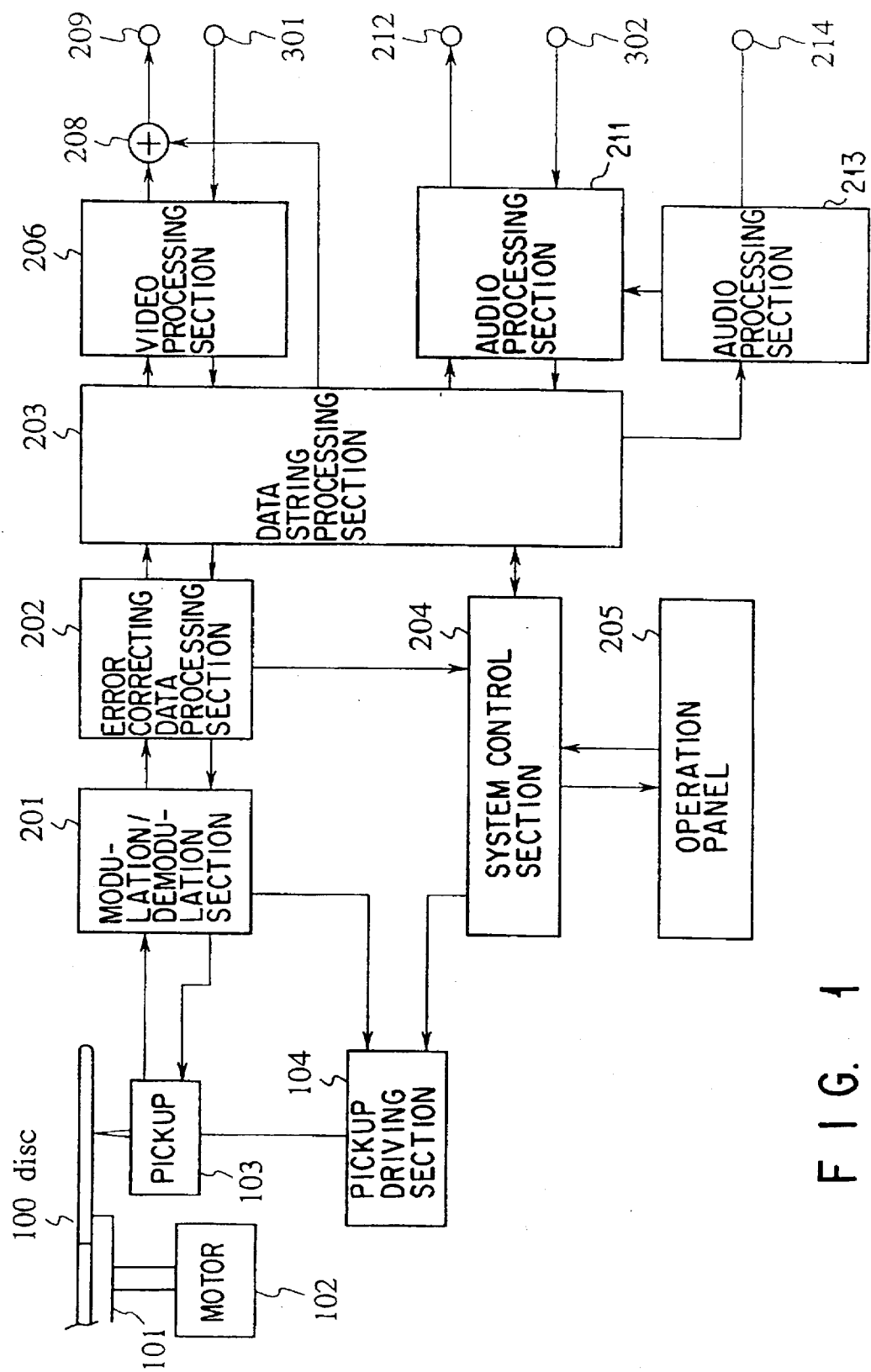
F I G. 1

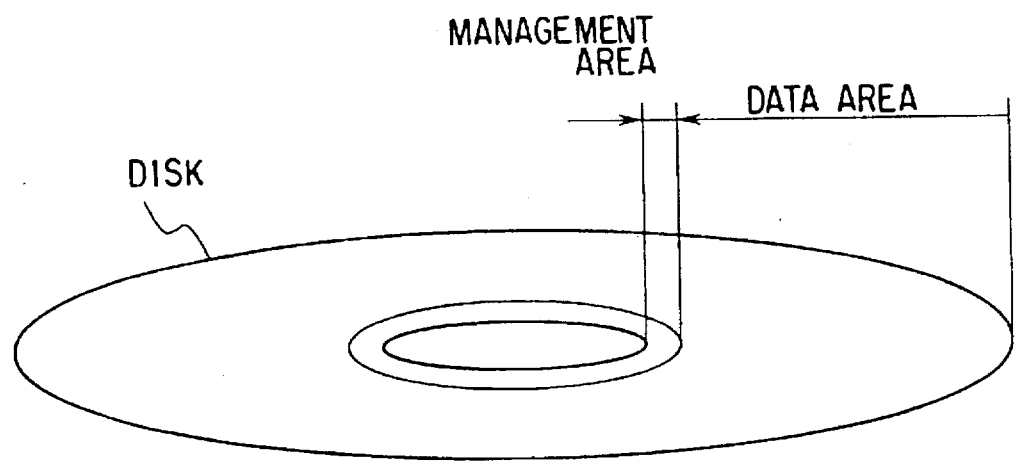
F I G. 2A
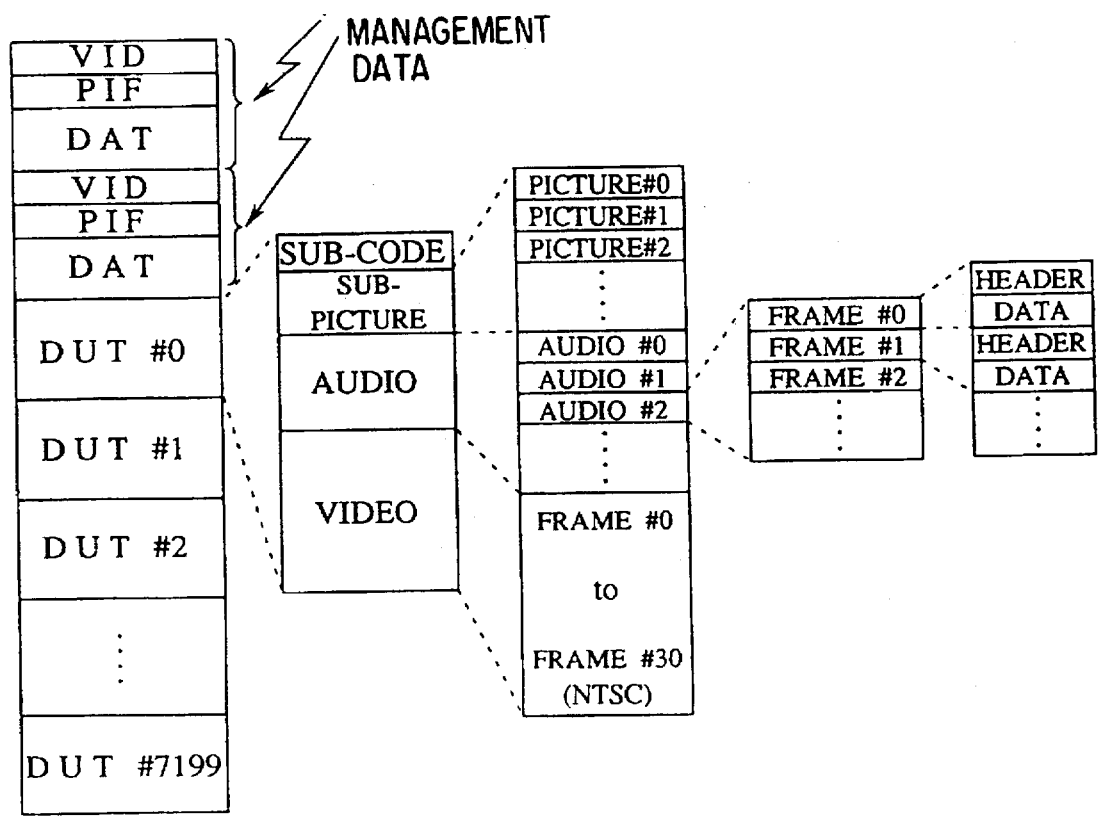
F I G. 2B

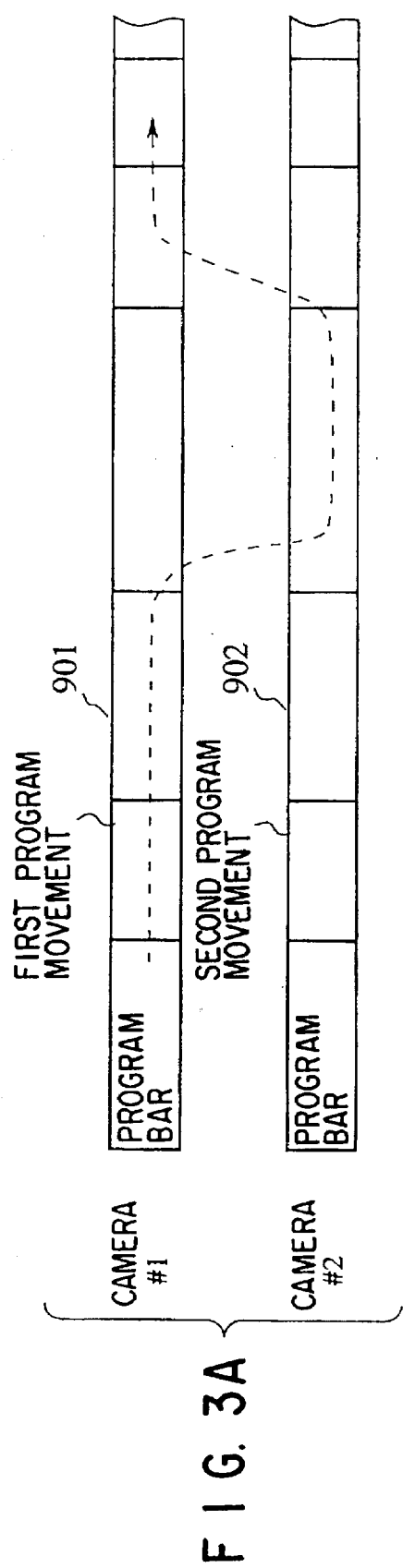
F I G. 3A
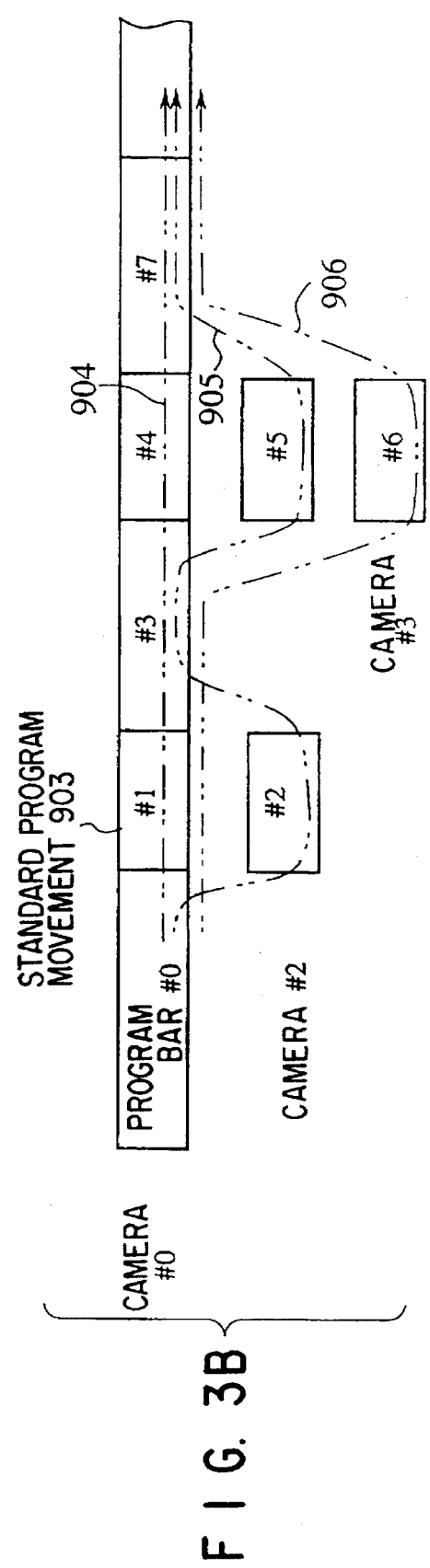
F I G. 3B

MULTI-SCENE MODE STARTS FROM HERE.
SELECT SCENE #1 OR #2.

FIG. 4A

MULTI-SCENE MODE STARTS FROM HERE.
SELECT SCENE #4, #5 OR #6.

FIG. 4B

MULTI-SCENE MODE STARTS FROM HERE.
4: BACK-NET ANGLE
5: CENTER-FIELDER ANGLE
6: FIRST-BASE ANGLE

FIG. 4C

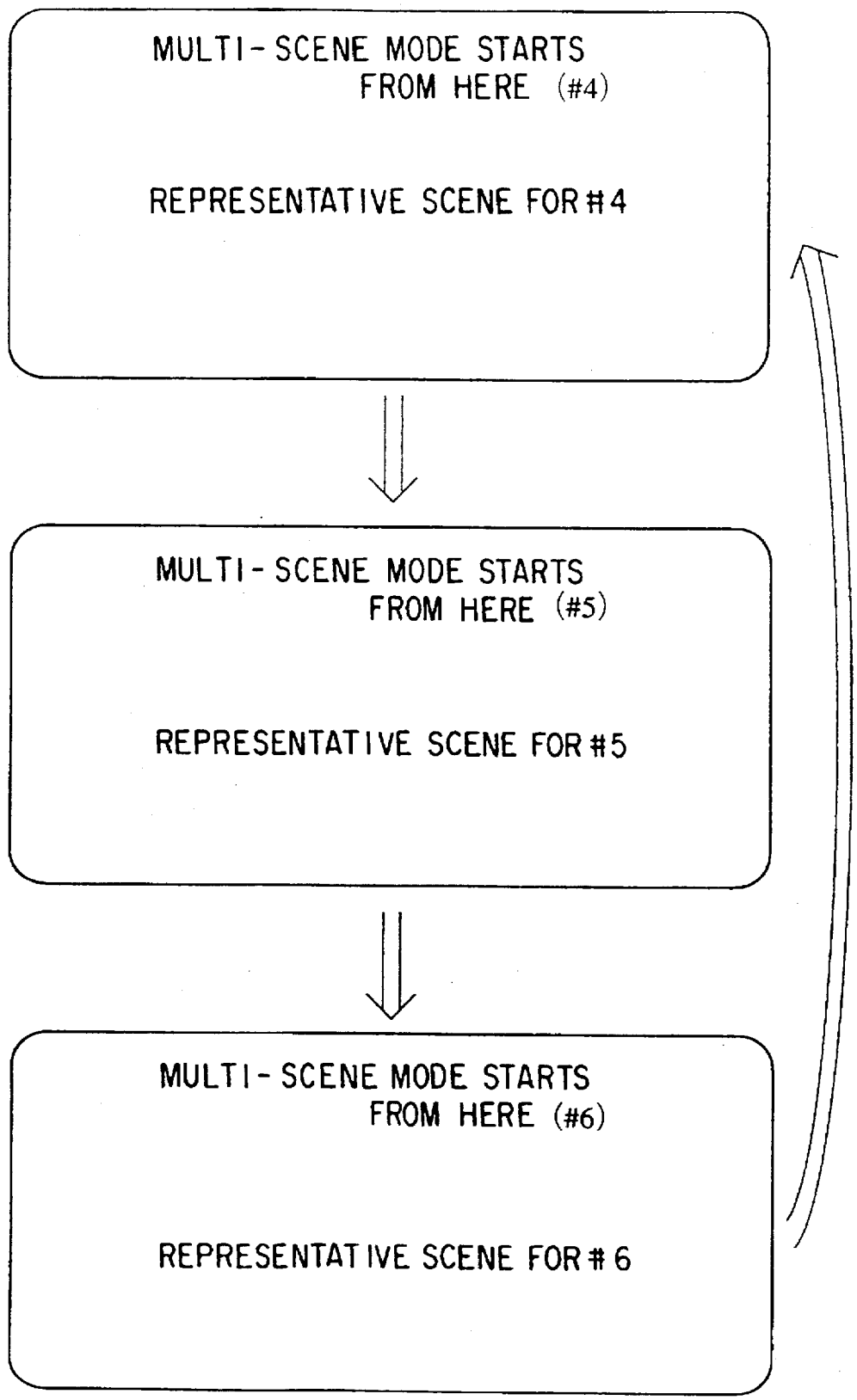
F I G. 6

MULTI-SCENE DATA STRINGS

MENU DISPLAYED

CAMERA #0 ☐

CAMERA #1 ☐

CAMERA #2 ☐

F I G. 7

VID

| PROGRAM BAR | #1 | #2 | |
|---|---|---|---|
| PROGRAM BAR | #4 | #5 | #6 |
| | | | |

FIG. 8A

PIF

| PROGRAM BAR | NEXT PROGRAM BAR TO BE REPRODUCED | |
|---|---|---|
| #0 | #1 | 1 |
| #1 | #3 | |
| #2 | #3 | |
| #3 | #4 | 1 |
| #4 | #7 | |
| #5 | #7 | |
| #6 | #7 | |

FIG. 8B

DAT

| PROGRAM BAR | TIME FOR REPRODUCING EACH DATA UNIT | PROGRAM BAR | TIME FOR REPRODUCING EACH DATA UNIT |
|---|---|---|---|
| #0 | 0<br>1<br>2<br>3° 40′ | #2 | 0<br>1<br>1° 18′ |
| #1 | 0<br>1<br>1° 18′ | | |

FIG. 8C

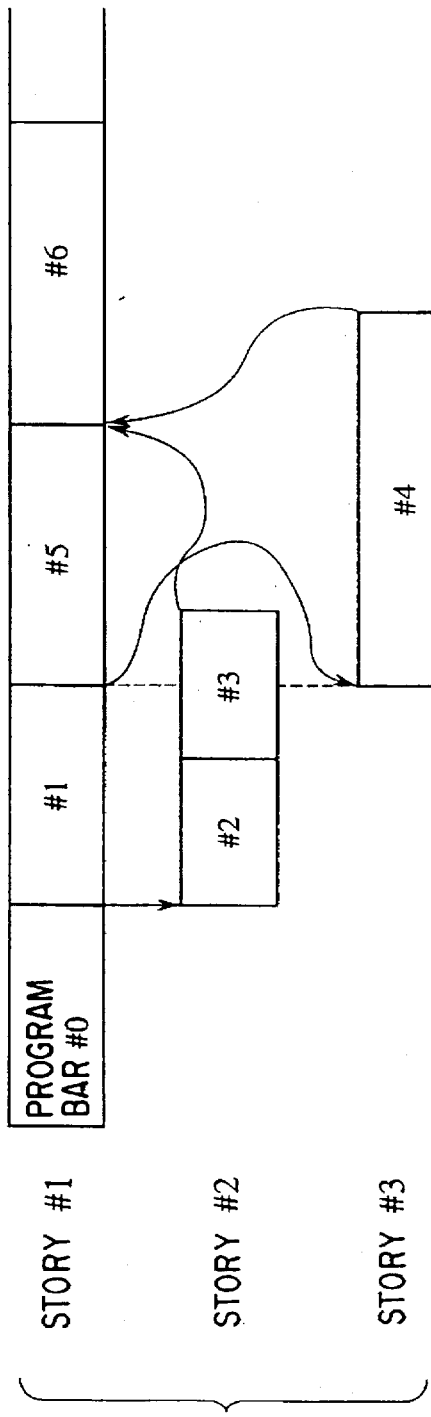
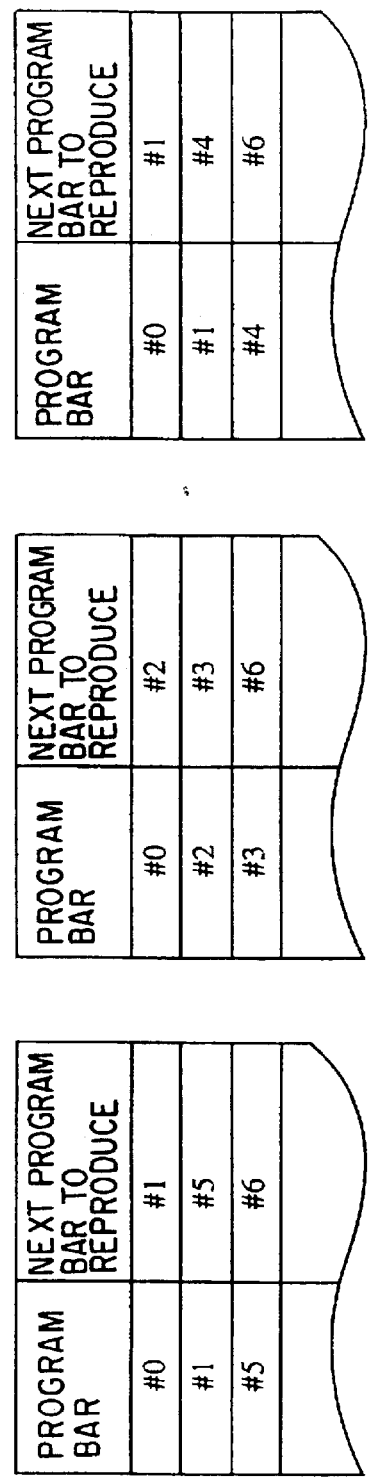

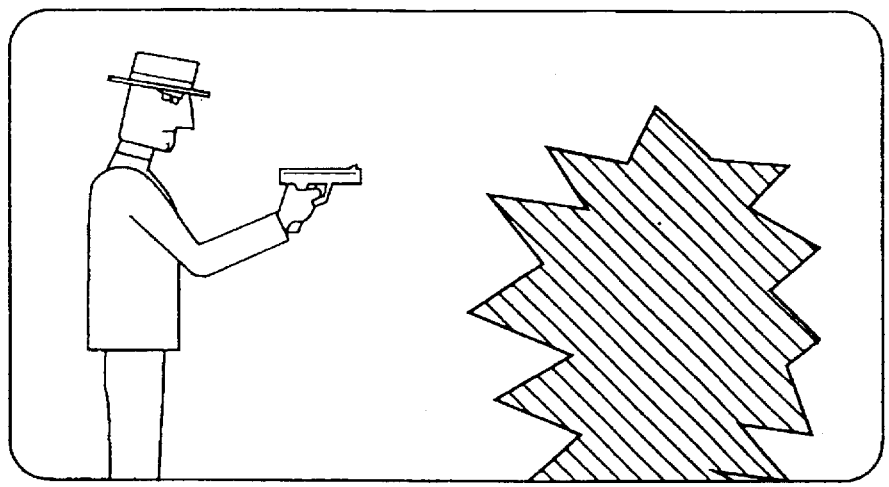
F I G. 10A
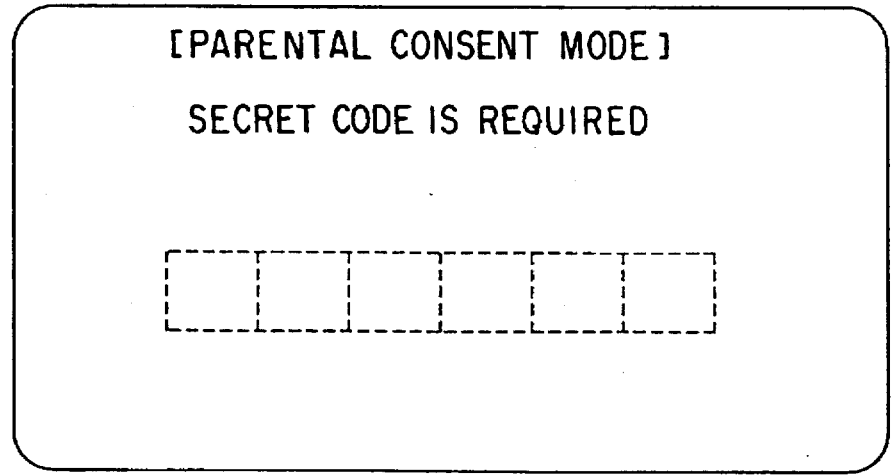
F I G. 10B

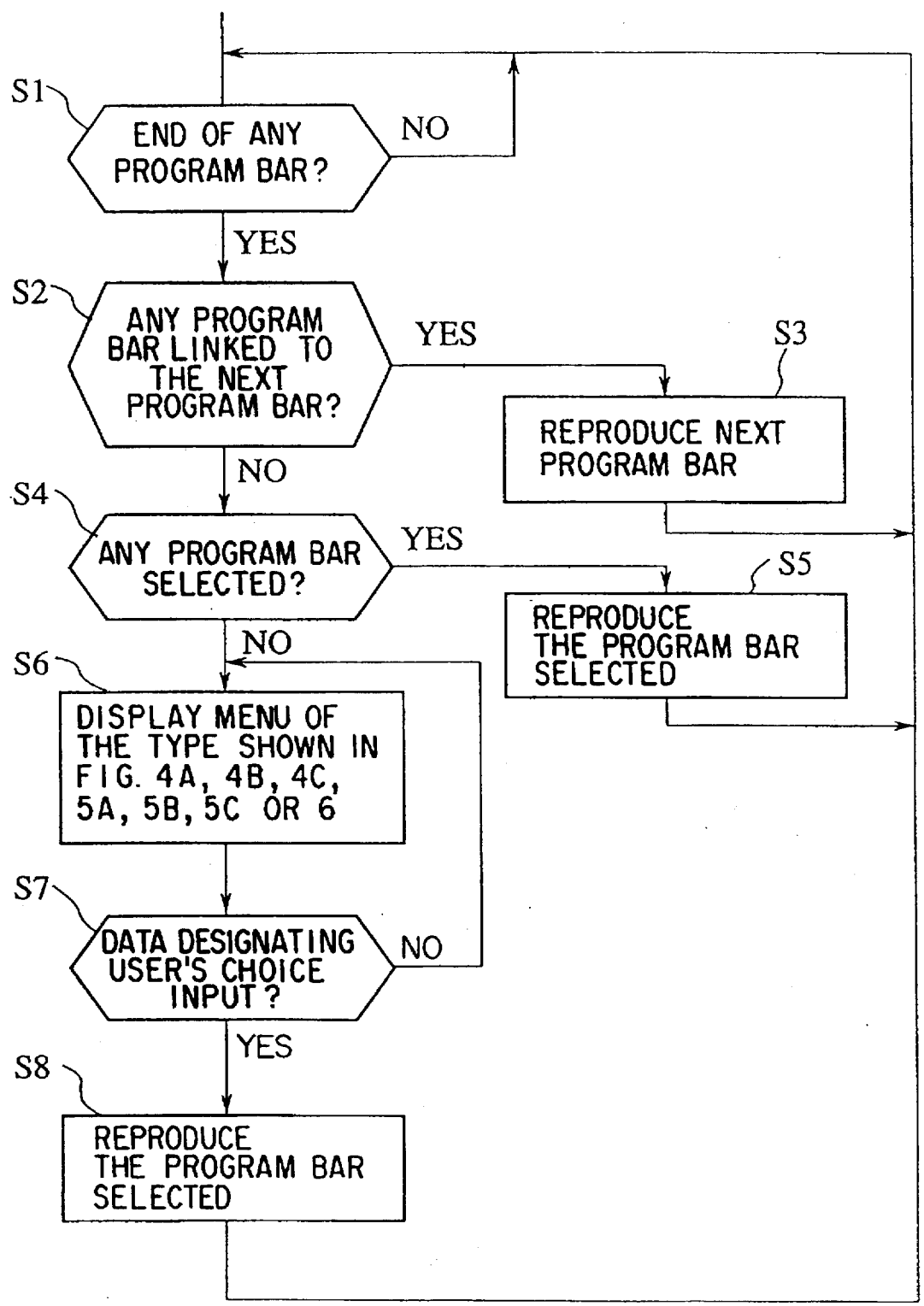
F I G. 11

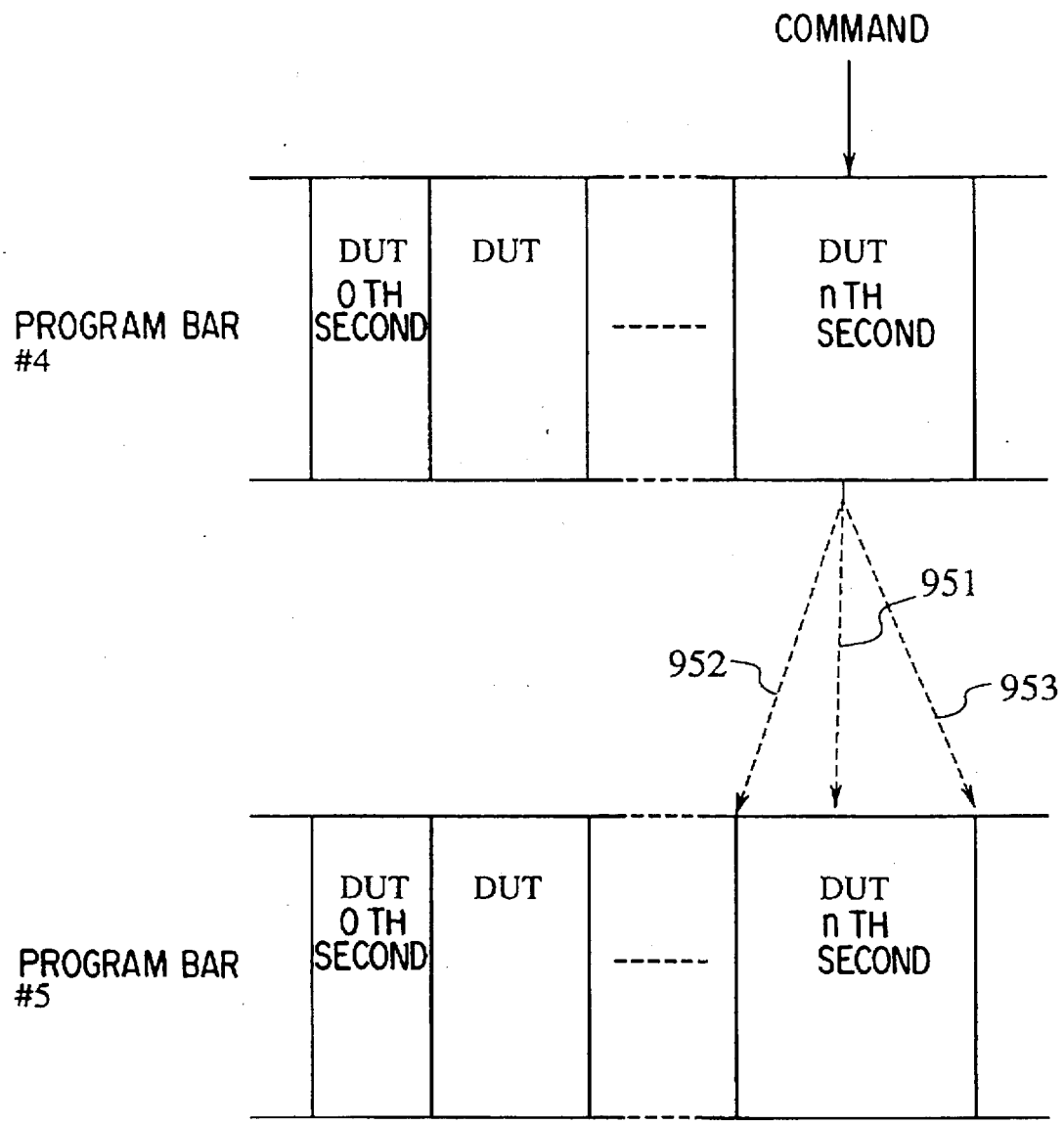
F I G. 13

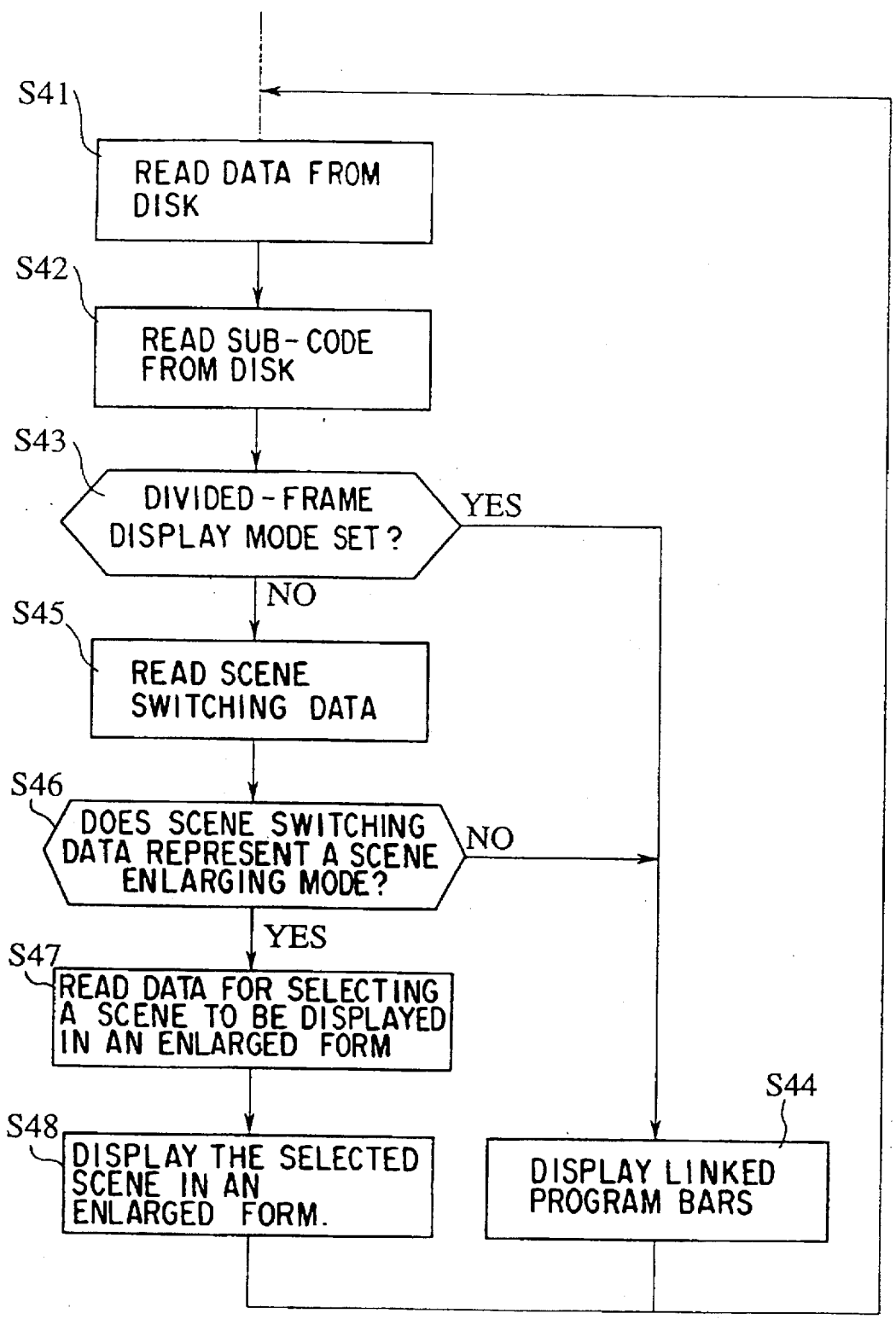
F I G. 17

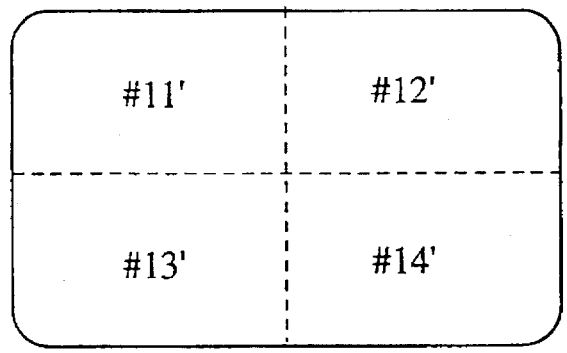
F I G. 18A
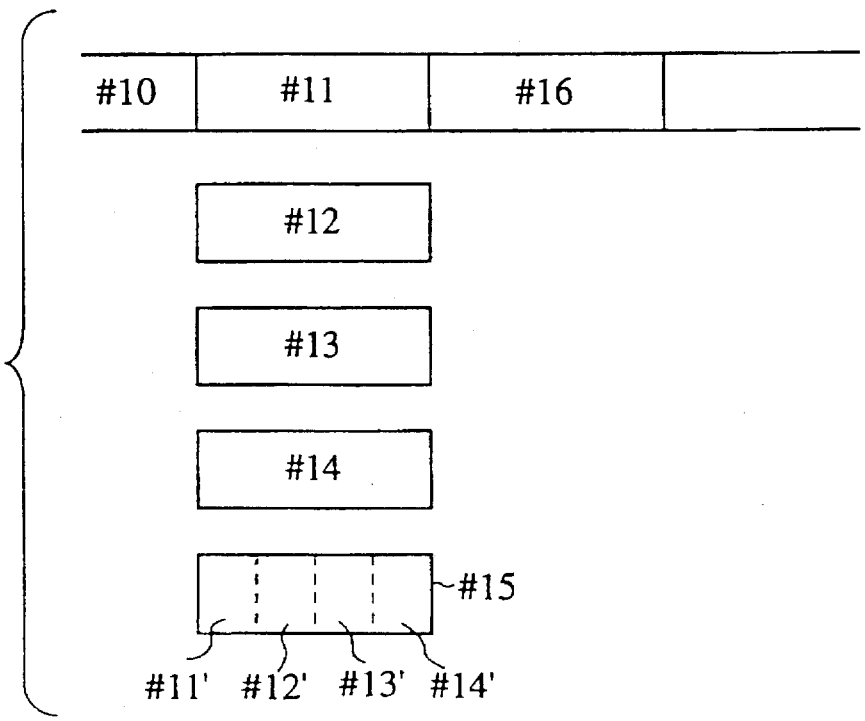
F I G. 18B

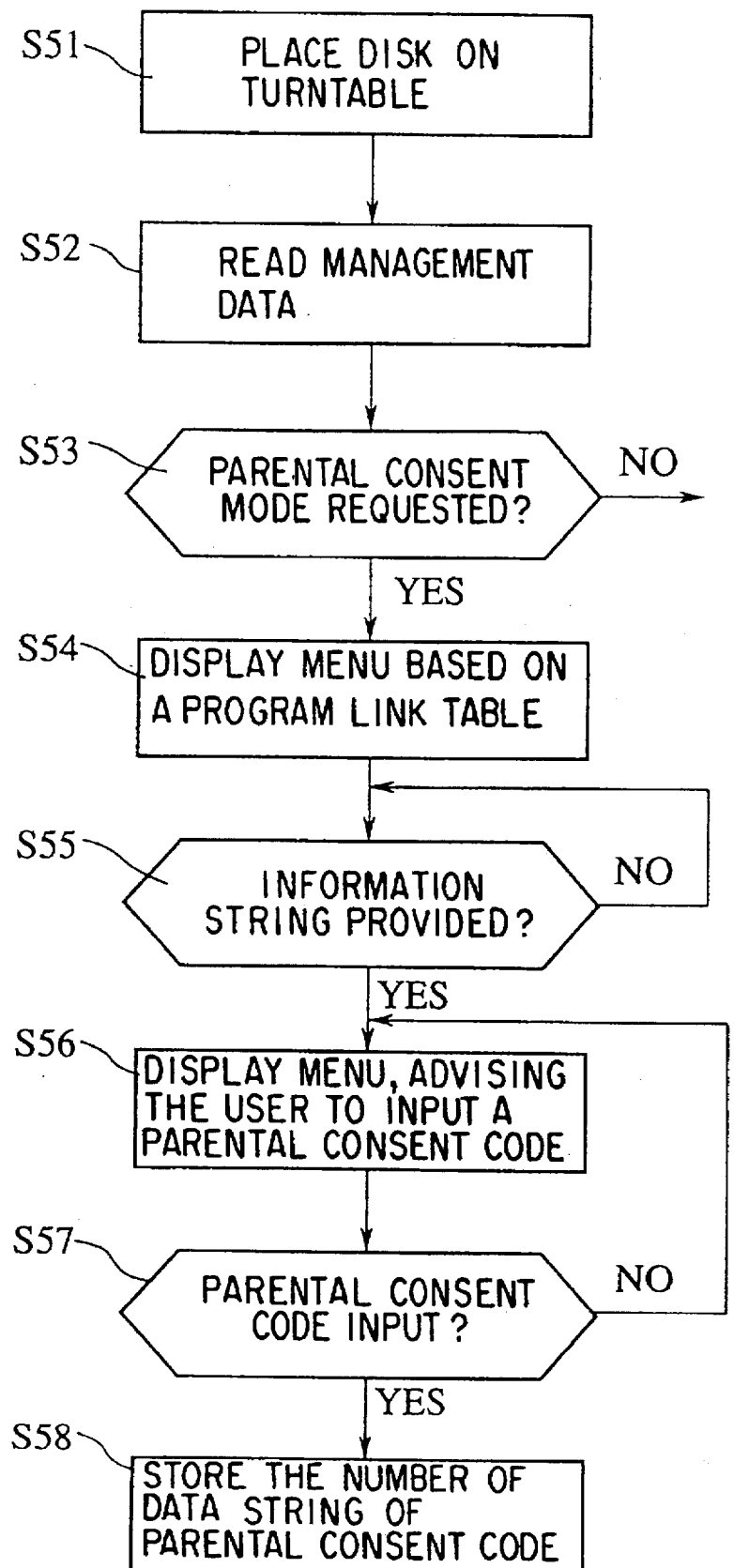
F I G. 19

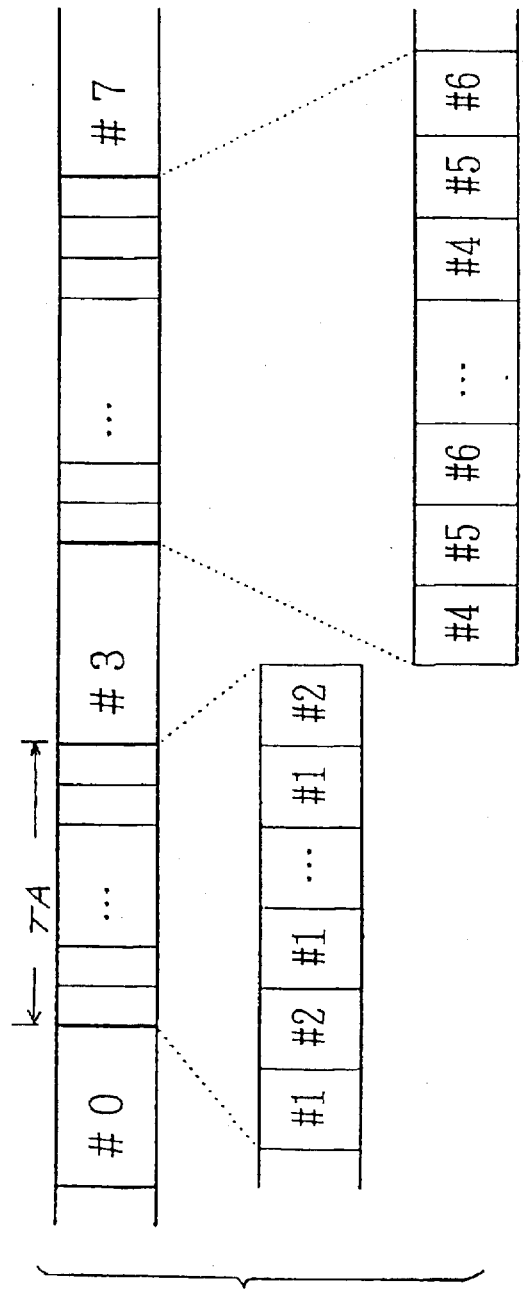
F I G. 21A
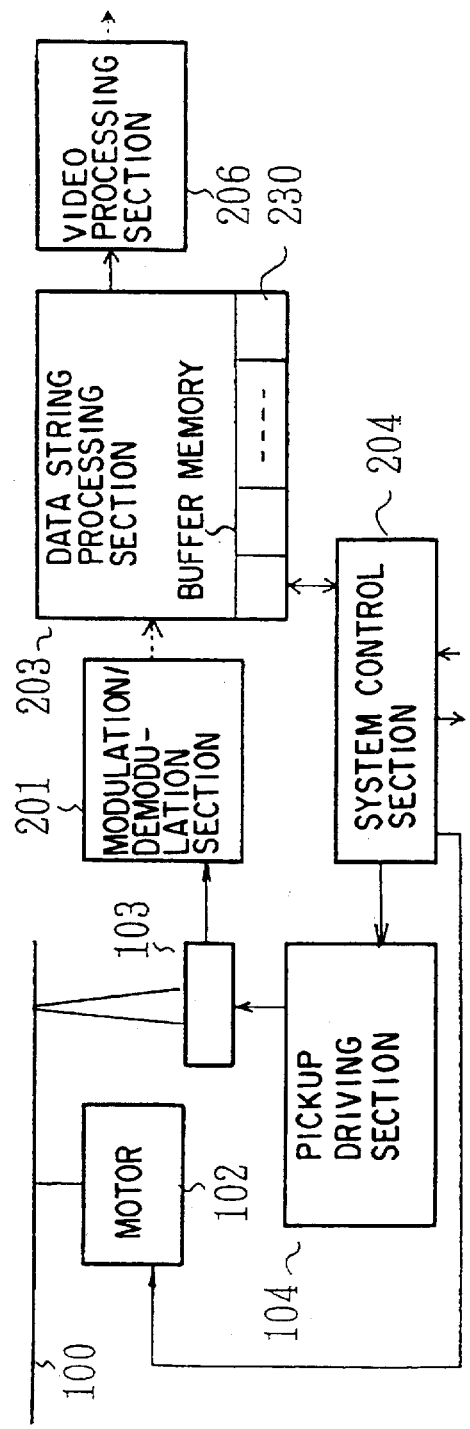
F I G. 21B

MULTI-SCENE RECORDING MEDIUM AND APPARATUS FOR REPRODUCING DATA THEREFROM

This is a division of application Ser. No. 08/454,289, filed Jun. 15, 1995 now U.S. Pat. No. 5,630,006.

TECHNICAL FIELD

The present invention relates to a multi-scene recording medium, such as an optical disk or a CD-ROM, for recording a program such as a movie, and also to an apparatus for reproducing any one of the data strings of the program, which represent independently proceeding scenes of a movie.

BACKGROUND ART

Conventional movies are formed from a time-series of scenes. They contain no scenes which proceed simultaneously. Hence, the audience sees only one scene at a time, and cannot enjoy seeing scene which can proceed along with the scene they are actually seeing. For example, the audience cannot see a scene of the cockpit of a space shuttle and a scene of the ground control center at the same time, though these scenes are proceeding simultaneously. This is because these scenes have been connected together forming a sequential time series of scenes which is generally known as a movie film. Another example may be an opera movie. Some of the audience may wish to see only the scene of the entire orchestra for some time, some others may want to watch the zoom-up face of a leading opera singer-player, and still some others may like to look into the conductor's zoom-up face. In other words, people in the movie theater may wish to, but cannot, see different scenes at different timing. With television broadcasting, it is possible to present two scenes of the same program at the same time on a multi-screen. For instance, a moving picture of an object, photographed at a long distance, and a moving zoom-up picture of the same object can be transmitted on two channels, respectively. Therefore, the TV watcher can select whichever picture he or she wants to see on the TV screen at any timing he or she wants.

However, the program data recorded on a recording medium is nothing but a time-series of scenes, and the user cannot see any other scene than the very scene being reproduced from the medium. In other words, he or she is unable to select one of the simultaneously proceeding scenes. Although movie film editors can combine two simultaneously proceeding scenes, forming a times series of scenes, the user can have but a limited freedom of selecting scenes.

With television broadcasting technology it is possible to transmits two or more simultaneously proceeding scenes through a plurality of channels. The program data recorded on a recording medium represents a time series of scenes, and the user has no freedom of selecting any one of simultaneously proceeding scenes.

SUMMARY OF THE INVENTION

Accordingly, an object of the present invention is to provide a multi-scene recording medium recording a program representing simultaneously proceeding scenes, and also an apparatus which enables a user to select any one of the simultaneously proceeding scenes.

Another object of the invention is to provide a multi-scene recording medium recording a program representing simultaneously proceeding scenes, and also an apparatus which enables a user to switch the simultaneously proceeding scenes, from one to another.

Still another object of the invention is to provide a multi-scene recording medium recording a program representing simultaneously proceeding scenes, and also an apparatus which enables only an authorized user to select specified ones of the simultaneously proceeding scenes.

A further object of this invention is to provide a multi-scene recording medium recording a program representing simultaneously proceeding scenes, and also an apparatus which can easily reproduce from the recording medium any one of the simultaneously proceeding scenes which a user wishes to enjoy.

The multi-scene recording medium according to the present invention has a management area and a data area. In the data area, there is recorded program information which comprises a first program movement containing a plurality of first program bars and a second program movement containing a plurality of second program bars. In the management area, there is recorded multi-scene configuration information representing the existence of the first and second program movements.

The data reproducing apparatus comprises scene selecting means for reading the multi-scene configuration information from the management area of the recording medium for reproducing the first program movement or the second program movement from the data area of the recording medium in accordance with the multi-scene configuration information.

Provided with the scene selecting means, the data reproducing apparatus gives a user the freedom of selecting one of simultaneously proceeding scenes, and enables a program editor to edit programs in new concept.

BRIEF DESCRIPTION OF THE DRAWINGS

FIG. 1 is a block diagram showing a data reproducing apparatus according to an embodiment of the present invention;

FIG. 2A is a diagram illustrating the recording regions of a disk according to this invention, and FIG. 2B is a diagram representing the data format of the disk shown in FIG. 2A;

FIGS. 3A and 3B are diagrams showing examples of data strings recorded on the disk shown in FIG. 2A;

FIGS. 4A to 4C are diagrams showing three different menus, respectively, which the apparatus of FIG. 1 displayed;

FIG. 6 is a diagram for explaining how the menus can be switched, from one to another, by operating the data reproducing apparatus;

FIG. 7 is a diagram representing a menu displayed by the data reproducing apparatus;

FIGS. 8A to 8C are diagrams illustrating the data tables recorded in the management area of the disk;

FIG. 9A shows another example of data string recorded on the disk, and FIGS. 9B to 9D are diagram illustrating information tables recorded on the disk;

FIGS. 10A and 10B are diagrams showing another example of a menu presented by the data reproducing apparatus;

FIG. 11 is a flow chart for explaining an operation of the data reproducing apparatus;

FIG. 13 is a diagram explaining how the data reproducing apparatus switches scenes;

FIG. 17 is still another flow chart for explaining an operation of the data reproducing apparatus;

FIG. 18A is a diagram showing an image which the data producing apparatus has reproduced, and FIG. 18B is a diagram illustrating an example of a data string recorded on the disk;

FIG. 19 is a flow chart for explaining an operation of the data reproducing apparatus;

FIG. 21A is a diagram illustrating another example of a data string, and FIG. 21B is a diagram showing part of the data reproducing apparatus which serves to process the data string.

DETAILED DESCRIPTION OF THE PREFERRED EMBODIMENTS OF THE INVENTION

Figure 5A:
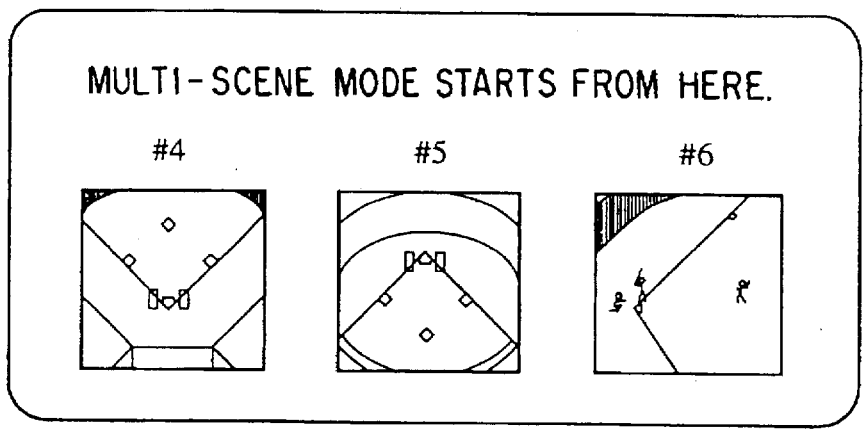
FIGS. 5A to 5C are diagrams showing other menus which the apparatus displays.

Hereinafter, embodiments of the present invention will be described with reference to the accompanying drawings.

As shown in FIG. 1, a recording medium such as an optical disk 100 (hereinafter referred to as "disk") according to the present invention is installed in a data recording/reproducing apparatus (access apparatus).

The disk 100 is placed on a turntable 101 which is rotated by a motor 102. In the reproducing mode, the information recorded on the disk 100 is read by pickup means 103. A pickup driving section 104 provides movement and tracking control of the pickup means 103. The output of the pickup means 103 is supplied to a modulation/demodulation section 201, which demodulates the signal into demodulated data. The data is supplied to an error correcting data processing section 202, which corrects errors and supplies the resultant signal to a data string processing section 203. The section 203 extracts video information, subtitle and character information, and audio information from the signal. As will be explained later, the subtitle and character information and audio information are recorded on the disk 100 in correspondence with the video information. Various languages can therefore be selected for the subtitle and character information and audio information. The selection is made under the control of a system control section 204. The user supplies the input from an operator panel 205 to the system control section 204.

Information, e.g., movie information, is recorded on the disk 100. More specifically, a plurality of simultaneously proceeding scenes are recorded on the disk 100, one of which can be selected by a user and can subsequently be reproduced. To enable the user to select one of the scenes and have it reproduced, the data string processing section 203, the system control section 204 and the operation section 205 constitute a data string control means and a scene selecting means.

The video information is separated at the data string processing section 203 and supplied to a video processing section 206. The section 206 decodes the data string in accordance with the type of the display unit used. For example, the section 203 converts the video information into a suitable form for an NTSC, PAL, SECAM, or wide screen. The video signal obtained by decoding the video information is supplied to an adder 208. The adder 208 adds the signal to the subtitle and character information. The resultant sum is supplied to an output terminal 209. Meanwhile, the audio information separated at the data string processing section 203 is supplied to an audio processing section 211. The section 211 demodulates the audio information into a demodulated signal, which is supplied to an output terminal 212.

The audio processing section 211 and another audio processing section 213 constitute an audio unit which works as a decoding section. The audio processing section 213 can reproduce speech in another language, which is supplied to an output terminal 214. (This function will be described later.)

The apparatus can record information on the disk 100. In the record mode, a video signal to be recorded is supplied to an input terminal 301, and an audio signal to be recorded is supplied to an input terminal 302. The video processing section 206 acts as a video encoder, whereas the audio processing section 211 as an audio encoder. The data string processing section 203 works as a formatter for recording information, and the error correcting data processing section 202 functions as an error code adding section. The data, thus processed, is modulated by the modulation section 201 and sent to the pickup means 103 as data to be recorded.

As described above, the disk 100 stores a plurality of program data items (multi-scene program data) which are related to one another. Therefore, the data reproducing apparatus can reproduce any of the program data items that the user has designated, and can stop reproducing one program data item and immediately start reproducing another program data item.

Also recorded on the disk 100 are: audio data including speed data in various languages, music data and sound effect data; and visual data such as subtitle data in various languages. One or more of these various types of data are selected and reproduced by the data string control means and scene selecting means constituted by the data string processing section 203, the system control section 204 and the operator panel 205.

The disk used in the invention, its recording format, and its application will be described.

A movie may be recorded on the disk used in the invention. In this case, the disk stores the data representing a plurality of simultaneously proceeding scenes, a plurality of language data items, and a plurality of subtitle data items in various languages.

FIG. 2A shows the data area of the disk 10. A management data area is provided at the center of the disk 10, and the data area surrounds the management data area. Recorded in the management area is management data for managing the programs recorded in the data area, as will be explained later. The programs recorded in the data area include subcodes, subpictures, audio information, and video information.

The kinds of information items recorded in the data area will be described, with reference to FIG. 2B.

FIG. 2B is an enlarged view of the contents of data unit DUT #0 in the data area. In data unit DUT #0, there is a subcode (SUB-CODE) at the start, followed by a subpicture information (SUB-PICTURE), audio information (AUDIO), video information (VIDEO) in the order they are mentioned. The subcode (SUB-CODE) contains the attributes of data unit DUT #0, such as the size of the data unit, the start positions of the video information and audio information included in the data unit, and control information for the data unit. Each subpicture (SUB-PICTURE) contains, for example, subtitle information (for movie video) or character information (for Kara-OK video and educational video). The subtitle information and the character information are comprised of eight pictures PICTUREs #0 TO #7 each. All of these PICTURES differ in language, (or some of them differ in language) and the remaining ones contain no signals. Furthermore, other items of information, which differ in purpose, such as those representing questions and answers, may be recorded on the disk 100. The audio (AUDIO) information is recorded in the form of music information or speech information, which consists of at most eight information items AUDIOs #0 to #7. (Each of the eight audio information items last about one second when reproduced). The audio (AUDIO) information can be used in various fashions; it may be reproduced in the form of a combination of orchestra and solo-singing or a combination of Kara-OK and vocal performance. The audio information is recorded in units of frames, each frame #0, #1 . . . comprising a header (HEADER) and data (DATA). The video (VIDEO) information consists of, for example, 30 frames of images. (When reproduced, the information lasts about one second). The video (VIDEO) information is recorded by high-efficient coded image compression technique. The number of frames is not limited by standard. The audio information has been subjected to high-effect encoding.

The types of data units DUTs will be described.

FIG. 3A illustrates an example of program data.

Hereinafter, a program forming one stream shall be called "program movement," and a plurality of programs forming the program movement shall be called "program bars." Each of the program bars is composed of a plurality of data units which have been explained with reference to FIG. 2.

The program data shown in FIG. 3A consists of two program movements 901 and 902 represents. The first program movement 901 represents a scene showing an entire orchestra, photographed by a first camera, and the second program movement 902 a scene showing a zoom-up picture of the conductor only, photographed by a second camera. Either the first program movement or the second program movement can be reproduced from the disk 100 by means of a monitor, so that a user may listen to the music and watch a moving picture of the selected program movement. Further, as is indicated by the broken line in FIG. 3A, the user can enjoy the picture and sound of the second program movement, while listening to the music of the second program movement 901 and seeing the picture thereof, reproduced and displayed on the monitor. That is, the user has freedom of selecting a scene. A program consisting of more program movements than the program shown in FIG. 3A may be recorded on the disk. The program movements of such a program may represent simultaneous proceeding scenes tracking brothers who grew in the same house and then started different walks of life.

FIG. 3B shows an example of a program data with which it is possible to output scenes which proceed simultaneously with part of the standard program movement 903. This program data can be smaller in amount than the program data of FIG. 3A. Of the program bars constituting this program data, the bars #1 and #2 form a multi-scene, and the bars #4, #5 and #6 form another multi-scene. The program data can be edited such that the standard program movement 903 is one photographed by a camera 0, the program bars #2 and #5 are those photographed by a camera 2, and the program bar #6 is one photographed by a camera 3.

Let us assume that the standard program movement 903 represents, for example, a time-series of baseball game scenes photographed by the camera 1 located right behind the home plate, that the program bars #2 and #5 represent two baseball game scenes photographed by the camera 2 installed in the outfield, and that the program bar #6 represents a baseball game scene photographed by the camera 3 set in the right stand. Then, when this program data is reproduced, the program bar #0 is reproduced first, and a menu is displayed immediately after the last frame of the program bar #0 has been reproduced. Thus, the user can select any one of the following scenes.

FIG. 4A shows an example of a menu which gives the user the opportunity to select any scene he or she wishes to see. The menu reads, "MULTI-SCENE MODE STARTS FROM HERE. SELECT SCENE #1 OR #2." At completion of the reproduction of the program bar #3, another menu is displayed which reads, as shown in FIG. 4B. "MULTI-SCENE MODE STARTS FROM HERE. SELECT SCENE #4, #5 OR #6." The menu may be displayed in another form. For example, as shown in FIG. 4C, it may read:

"MULTI-SCENE MODE STARTS FROM HERE.
4: BACK-NET ANGLE
5: CENTER-FIELDER ANGLE
6: FIRST-BASE ANGLE"

The user operates the operator panel 205, thereby selecting one of the program bars. The data reproducing apparatus reproduces the program bar selected.

As mentioned above, the menu shown in FIG. 4A, FIG. 4B or FIG. 4C is displayed at completion of the reproduction of any program bar.

Figure 5B:
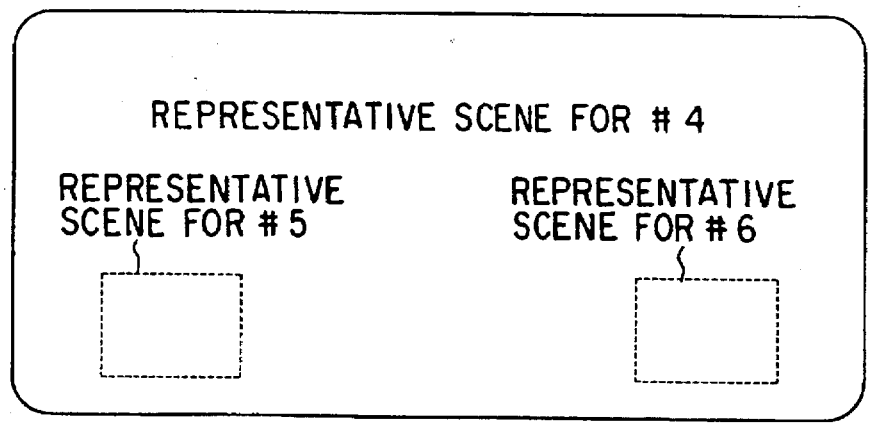

Instead, other types of menus may be displayed. For example, as shown in FIG. 5A, representative scenes or heat scenes of the program bars #4, #5 and #6 are simultaneously read from the disk and displayed. Alternatively, as shown in FIG. 5B, the scene of the standard program movement 903 is displayed in a large size, whereas the representative scenes of the program bars #5 and #6 are displayed in a small size. This also gives the user freedom of selecting scenes.

Figure 5C:
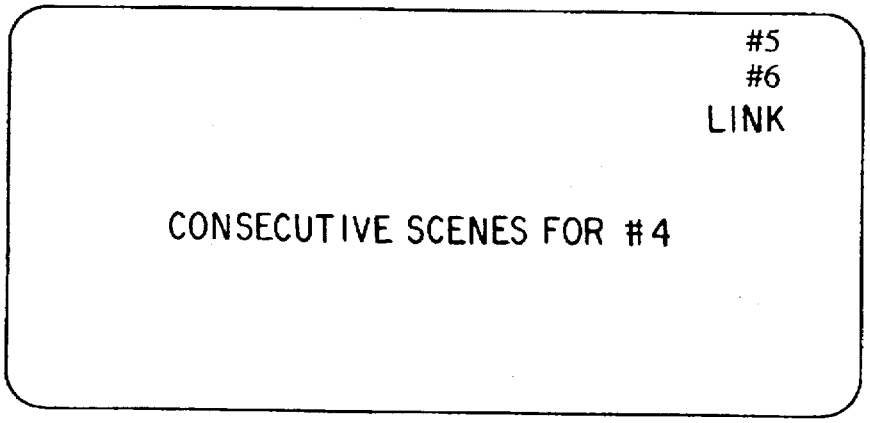

Also, as shown in FIG. 5C, only the key data of the program bars #5 and #6 may be displayed, for example, in the order of the screen, while the scene of the program bar #4 of the standard program movement 903 is displayed, thereby indicating that there are program bars #5 and #6 which correspond to the program bar #4.

Furthermore, as shown in FIG. 6, the representative scenes of the program bars #4, #5 and #6 may be repeated and cyclically displayed, one after another, each scene for a period of, for example, two seconds. In this case, the user selects the desired program bar by operating the operator panel while the representative scene of the desired program bar is being displayed.

In the instances described above, while the standard program movement 903 is being reproduced, a menu is displayed to inform the user that a program bar other than those of the program movement 903 is recorded on the disk, constituting a multi-scene. According to the present invention, the user can designate and set an order in which program bars should be reproduced.

FIG. 7 shows an example of a menu which is displayed when the disk is inserted into the data reproducing apparatus. The data reproducing apparatus reads the management data from the disk 100 and determines that there are two or more program bars recorded representing simultaneously proceeding scenes. Then, the apparatus causes the monitor to display the menu. Seeing the menu, the user operates the operator panel 205, to select from among the image photographed by the camera #0, the image photographed by the camera #2, or the image photographed by the camera #3. If the key data corresponding to the camera #0 is selected, the apparatus is set to reproduce the program bars of the data string 904 shown in FIG. 3B. If the key data corresponding to the camera #2 is selected, the apparatus is set to reproduce the program bars of the data string 905 shown in FIG. 3B. If the key data corresponding to the camera #3 is selected, the apparatus is set to reproduce the program bars of the data string 906 shown in FIG. 3B.

The management data recorded in the management area of the disk 100 will be explained first. This data is provided in the form of a management table.

As shown in FIG. 2, the management table consists of a volume identity field (VID), a picture information field (PIF), and a data unit allocation table (DAT). The the VID is the innermost annular field of disk 100. The PIF is the second innermost annular field surrounding the VID. The DAT is the third innermost annular field.

The VID is a 256-byte field, the first byte of which is the first byte in the management area. The VID represents various items of information about the disk 100, among which are items showing the countries where the recorded languages are used.

As shown in FIG. 8A, when there are program movements and bars which constitute a multi-scene, information regarding how those program bars are combined is recorded in table form. FIG. 8A shows the combined information on the program shown in FIG. 3B.

The link of the program bars is defined by the PIF. FIG. 8B shows the PIF used for controlling the program data illustrated in FIG. 3B. The number (e.g., the first address) of the current and subsequent program bar to be reproduced is defined in the PIF. As can be understood from FIG. 8B, the program bar #1 will be reproduced after the program bar #0 has been reproduced, the program bar #3 will then be reproduced immediately after the program bar #1 has been reproduced, and so forth. The fact that the program bars #1 and #2 represent two simultaneously proceeding scenes is recognized not from the PIF, but from the VID. The control software has been prepared so as to display a menu, giving the user a chance to select program bar #1 or #2 after the completion of the reproduction of the program bar #0. Namely, the data reproducing apparatus does not immediately start reproducing the program bar #1 immediately after reproducing the program bar #0. Rather, it waits until the user inputs bar-selecting data. If the user selects the program bar #2, the data reproducing apparatus begins to reproduce the program bar #3 after the reproduction of the program bar #2, in accordance with the program link which is recorded in the PIF.

After reproducing the program bar #3, the data reproducing apparatus waits for any instruction made by the user. This is because the program bar #4, which is to be reproduced after the program bar #2 (as defined by the program link recorded in the PIF), represents a scene which proceeds simultaneously with those represented the program bars #5 and #6. After reproducing the program bar #4, #5, or #6, the data reproducing apparatus starts reproducing the program bar #7, as defined by the program link recorded in the PIF.

Recorded in the PIF is information on various elements of each program. For example, 16 bytes are used for each program bar. The information includes the start and end time of the program bar, no matter whether the program bar is for home video, movie, Kara-OK, computer graphics, interactive use, game or computer data. The identification of a speech encoding system, the identification of an image encoding system, and the picture attributes (i.e., the information identifying the aspect ratio and a system such as PAL or NTSC system, and information on horizontal resolution and vertical resolution). It also includes a start pointer having a value indicating the DAT address at which the data at the start point of a program bar is recorded.

In the DAT, the information indicating the order in which the program bars of a program are to be read from the data area of the disk 100, after the program bar been selected and identified.

The DAT contains parameters such as a zone number (NZON), a sector number (NSCT), a track number (NTRC), a program time (PTMB), and a ling pointer (PNTL). From the zone number (NZON), the track number (NTRC) and the sector number (NSTC), the sector at the start of the data unit can be determined. The NZON is the zone number to which the sector at the start of the data unit belongs. The zone number is assigned to a unit of a plurality of tracks, separated from any other unit in the radial direction of the disk; zone number 0 is assigned to the innermost unit of tracks. The NSTC indicates the number of the sector at the start of the data unit recorded in a track. The sector number is a number complete in the zone. The NTRC indicates a track number in the zone. The PTMB is a flag representing the time position of the image data (i.e., I picture) at the start of the data unit. The time position is the time (in seconds) elapsed from the program starting point. The time position is used in searching for time codes. Furthermore, the time position is input into the data reproducing apparatus. The apparatus uses the time position as the start reference data in order to display the program time, the absolute time, the remaining time of the program, and the like. The PNTL is a flag showing the data unit number immediately following the present data unit number in time. The unit for this flag corresponds to the number of the data unit. When there is no link designation at the end of the program, all bits are set at "1" (=0xFFFF). The effective value for the link point ranges from 0x0000 to 0xFFFF.

FIG. 8C illustrates part of the DAT. Assume the program bars #0 and #1, both shown in FIG. 3B, last 3 minutes 40 seconds and 1 minute and 18 seconds, respectively. Then, as shown in FIG. 8C, the lasting time of 1 minute and 18 seconds is set for the program bar #2 which is linked to the program bar #1 as shown in FIG. 3B. Thus, if the standard program movement 903 represents a series of scenes showing an orchestra playing music, which has been photographed by a camera located at a position, then it is possible for the user to select and see another scene of the orchestra, photo-graphed by a camera located at a different position. As shown in FIG. 8C, the DAT contains a zone number (NZON), a sector number (NSTC), a track number (NTRC), and a link pointer (PNTL). It is the program time (PTMB) which corresponds to the time for which each data unit last. In other words, the PTMB indicates the period for which each of the data units forming any the program bar reproduced from the disk 100.

Once a program to be reproduced has been determined, the system control section 204 controls the pickup driving section 104. Under the control of the section 204, the section 104 moves the pickup means 103 to that portion of the disk 100 where the desired program is recorded. Thus, the apparatus reproduces the desired program from the disk 100 in accordance with the management data read from the management area of the disk 100 and the selection data input by the user.

In the program illustrated in FIG. 3B, the program bars which are linked to one another will last for the same period of time they have been reproduced. For example, as has been described, the program bars #1 and #2 will last for the same time of 1 minute and 18 seconds when they are reproduced.

A program, which does not include audio information representing a piece of music continuously lasting for some time, may be recorded on the disk 100 in a form different from the program illustrated in FIG. 3B. FIG. 9A shows the format of such a program. This is a movie program consisting of three program movements representing three stories 1, 2 and 3. More specifically, the program bars #0, #1, #5 and #6 represent the story 1 about a first hero; the program bars #0, #2 #3 and #6 represent the story 2 about a second hero; and the program bar #0, #1, #4 and #6 represents the story 3 of the third hero. In the case of a multi-scene story like this, the program bar #1 need not last for the same time as the program bars #2 and #3, when reproduced. When a program of this type is recorded on the data area of the disk, the picture information field (PIF) recorded in the management area of the disk contains a plurality of program link tables of the types. The table shown in FIG. 9B is a standard PIF table which is used when the user selects the story #1. The table of FIG. 9C is a standard PIP table which is used when the user selects the story #2. The table of FIG. 9D is a standard PIF table which is used when the user selects the story #3.

The various types of the multi-scene movie programs thus far described can be reproduced from the disk in such a way that the user can select and enjoy any one of the simultaneous proceeding scenes or stories.

According to the present invention, it is possible to record a multi-scene movie program such that specified ones of the scenes or stories cannot be selected or enjoyed by those who are not authorized in accordance with laws or in only some countries.

The specified scenes or stories cannot be selected or enjoyed in some countries, because they are prohibited from being displayed in those countries.

More specifically, the sub-code (SUB-CODE) of the data unit DUT representing, for example, the story #3 may contain a parental consent code or a country code, or both, thus prohibiting the story #3 of the movie program. In this case, when the user selects story #3, the data reproducing apparatus reads the program bar #4 from the disk 100, but will replace or mask the scene represented the program bar #4, either entirely or partly, with a totally different image. The parental consent code authorizes only the parents to have access to the scenes or stories to which this code is added. The country code is contained in the sub-code (SUB-CODE) of the data unit DUT recorded on a disk 100 sold in a country where the specified scenes or stories should not be displayed. Either type of a code is recognized in the data reproducing apparatus.

The video information representing the different image which will replace or mask the scene represented by the program bar, either entirely or partly, is recorded on the disk. Also, management data showing the address of this video information is contained in the standard PIF table which is used when the user selects a story. Alternatively, the data reproducing apparatus may incorporate a device for generating signals for jamming or masking the scene represented by the program bar selected.

When a country code is used, it defines a combination of scenes, i.e., a combination of program bars. If a country code for Country A is contained in the sub-code (SUB-CODE) recorded on the disk to be sold in Country A where the scene represented by the program bar #4 must not be displayed, the country code defines the combination of scenes #0, #2, #5 and #6. If a country code for Country B is contained in the subcode (SUB-CODE) recorded on the disk to be sold in Country B where the scene represented by the program bar #5 must not be displayed, the country code defines the combination of scenes #0, #1, #4 and #6. The combination of scenes, thus defined, can be displayed on the monitor as the data reproducing apparatus reproduces the corresponding program bars from the disk. Any country code contained in the sub-code (SUB-CODE) is compared with the various country codes stored in the data reproducing apparatus. If it is identical with none of the country codes stored in the apparatus, the apparatus will not reproduce the corresponding program bar.

FIG. 10A is a diagram showing a scene which is masked in part. FIG. 10B is a diagram illustrating a scene replaced by an image, such as a message telling the user that the program being reproduced in parental consent mode and that the user needs to input the secret code in order to release the parental consent mode.

It will now be described how to switch simultaneously proceeding scenes, from one to another.

FIG. 11 is a flow chart explaining how the data reproducing apparatus operates to give the user a chance to select one of the simultaneously proceeding scenes represented by the program bars recorded on the disk 11. It is determined whether or not the end of any program bar is being reproduced (Step S1). If the end of any program is being produced, it is determined whether or not any program bar is linked to the next program bar (Step S2). This is possible by storing the management data into a work memory incorporated in the data producing apparatus. If such a program bar is linked to the next program par, the next program bar linked to the first one is reproduced from the disk (Step S3). If such a program bar is not linked to the next program bar, it is determined whether or not any data has been input which indicates that any program bar has already been selected (Step S4). The data, if any, has been input by operating the operator panel before the program is reproduced and has been stored in the memory incorporated in the system control section, as shown in FIG. 7. If such data has been input, the selected program bar is reproduced from the disk (Step S5). If such data has not been input, a menu of the type shown in FIG. 4A, 4B, 4C, 5A, 5B, 5C or 6 is displayed on the monitor, giving the user a chance to select one of the candidate program bars (Step S6). Then, it is determined whether or not the user has input data designating his or her choice using the operator panel (Step S7). If the user has input this data, the program bar selected is reproduced (Step S8). If the user has not input such data, Step S6 is performed again. If no data is input from the operator panel for a predetermined time, the program bar of the standard program movement will be automatically selected, reproduced from the disk, and displayed on the monitor.

Figure 12:
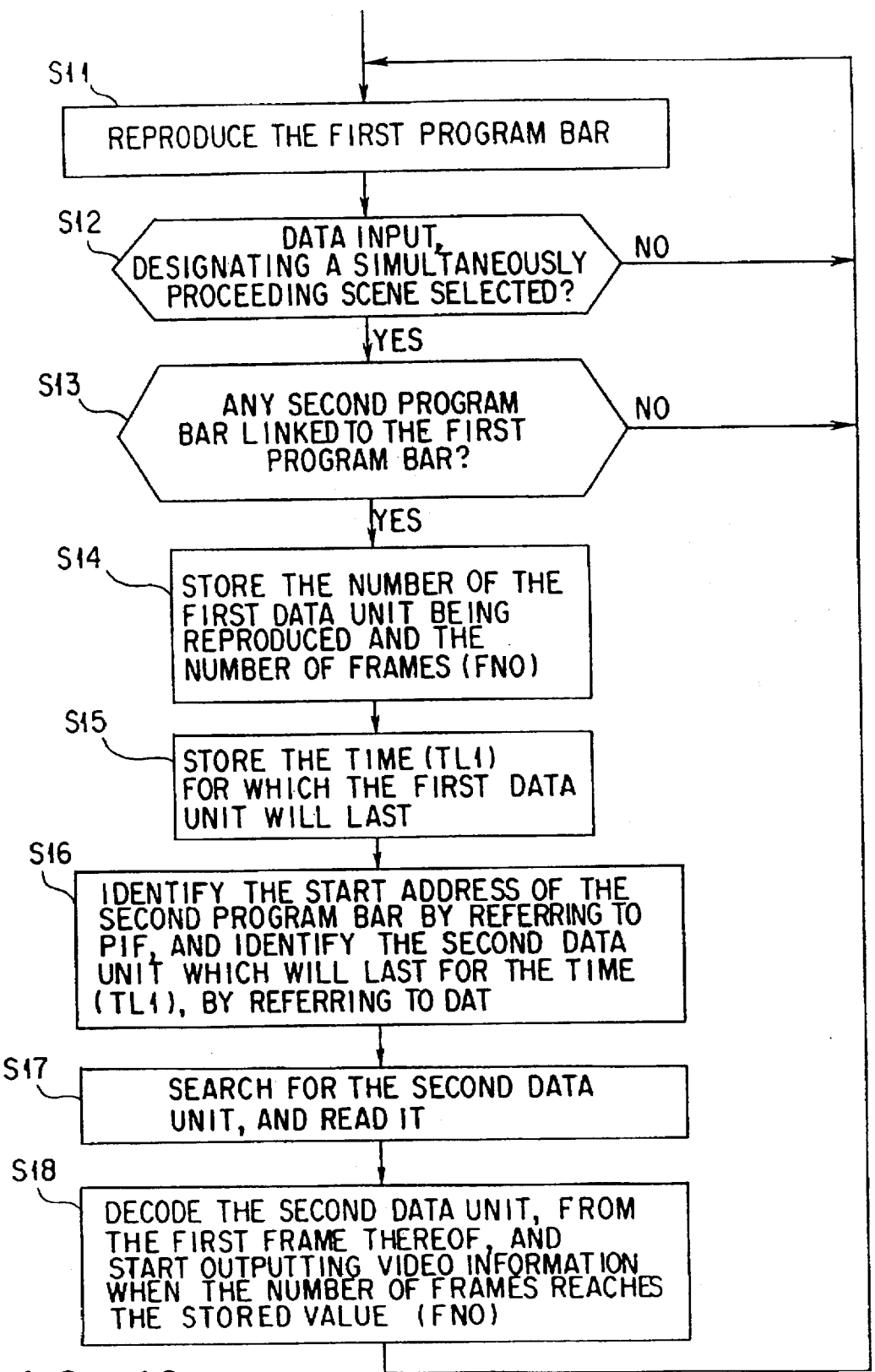
FIG. 12 is also a flow chart for explaining an operation of the data reproducing apparatus.

FIG. 12 is a flow chart for explaining how the data reproducing apparatus operates when the user inputs the data designating a desired scene for viewing, at any time while the first program bar is being reproduced from the disk. In this case, program bars representing simultaneously proceeding scenes can be switched, from one to another, without break.

While the first program bar is being reproduced, it is determined whether or not data designating any selected one of simultaneously proceeding scenes has been input (Steps S11 and S12). If the data has been input, it is determined whether or not any second program bar is linked to the first program bar, by referring to the volume identity field (VID) of the management table (Step S13). If the second bar is linked to the first program bar, the number of the first data unit contained in the first program bar, and the number (FNO) of the frames of the first program bar which have already been reproduced are stored into a memory (Step S14). Further, the time (TL1) for which the first data unit will last when reproduced is input also into the memory (Step S15). The time (TL1) can be obtained from the data unit allocation table (DAT), as has been explained with reference to FIG. 8C. Then, the start address of the second program bar to be reproduced is identified by referring to the picture information field (PIF), and the data unit contained in the second program unit which will last for a time equal to the time (TL1) when reproduced is identified by referring to the data unit allocation table (DAT) (Step S16). Then, the data reproducing apparatus controls the pickup driving section 104, whereby the pickup means searches for the start address of the second data unit (Step S17). Then, the data reproducing apparatus decodes the second data unit, from the first frame thereof, but section 203 prohibits the output of video information until the number of frames counted reaches the number (FNO) of the frames of the first program bar which are stored into the memory (Step S18).

The function illustrated in the flow chart of FIG. 12 may be incorporated in the data reproducing apparatus, either singly or together with the function represented in the flow chart of FIG. 11. If the flow chart of FIG. 11 and that of FIG. 12 are incorporated in the apparatus and used as main flow and sub flow, respectively, the latter will serve as an interruption routine, wherein Step S18 is followed by Step S11. Alternatively, the flow charts of FIGS. 11 and 12 may be incorporated into the apparatus such that they can be switched, from one to the other. In this case the menu shown in FIG. 5C or FIG. 7 is desirable. Namely, to allow the user to have a multi-scene with the present scene covered as little as possible. It is preferable to display the menu screen of FIG. 5C. When the user knows before the reproduction of the disk that there is a program containing a multi-scene and has decided to use the program, a multi-scene screen as shown in FIG. 7 is preferable. If the menu of FIG. 5C the choice, it should better be displayed in a step between Steps S13 and S14 in FIG. 12.

In Step S18 (FIG. 12), the output of video information may be initiated in an following alternative way, which will be explained below.

FIG. 13 is a diagram illustrating the timing of giving a command to the system control section in order to switch the program bars (FIG. 3A) representing simultaneously proceeding scenes, for example, from the program bar #4 to the program bar #5. Assume that the command is input the moment the fifth frame of the nth-second data unit (DUT) contained in the program bar #4. Then, the data reproducing apparatus starts outputting video information, frame by frame, from the fifth frame of the nth-second data unit of the program bar #5 if the apparatus performs the sequence of steps shown in FIG. 12. In other words, the apparatus starts outputting the video information counting the fifth of the pulses, each generated upon completion of a frame. When the apparatus starts outputting the video information, the nth-second data units of the program bars #4 and #5 have the positional relationship indicated by broken line 951. Alternatively, the apparatus may start outputting video information when the first frame of the nth-second data unit of the program bar #5 is decoded in its entirety, as is illustrated by broken line 952. Still alternatively, the apparatus may start outputting video information at the time the first frame of the (n+1)th-second data unit of the program bar #5 is decoded in its entirety, as is illustrated by broken line 953.

If time is available before the apparatus starts outputting the video information contained in the program bar #5, the last frame of the video information contained in the program bar #4, which has been already output, is written into the image memory incorporated in the decoder or the system control section 204. The last frame is repeatedly read from the image memory, whereby the scene represented by the last frame the video information is displayed on the monitor in the form of a still picture.

Assume that the nth-second data unit in the program bar #4 and the nth-second data unit in the program bar #5 represent two images of the same actor uttering words, which have been photographed by two cameras and, thus, at different angles. In this case, the program bars #4 and #5 are identical in terms of audio information. Hence, the audio information (AUDIO shown in FIG. 2B) contained in the nth-second data unit in the program bar #4 can be used while the nth-second data unit in the program bar #5 is being reproduced from the disk.

Figure 14:
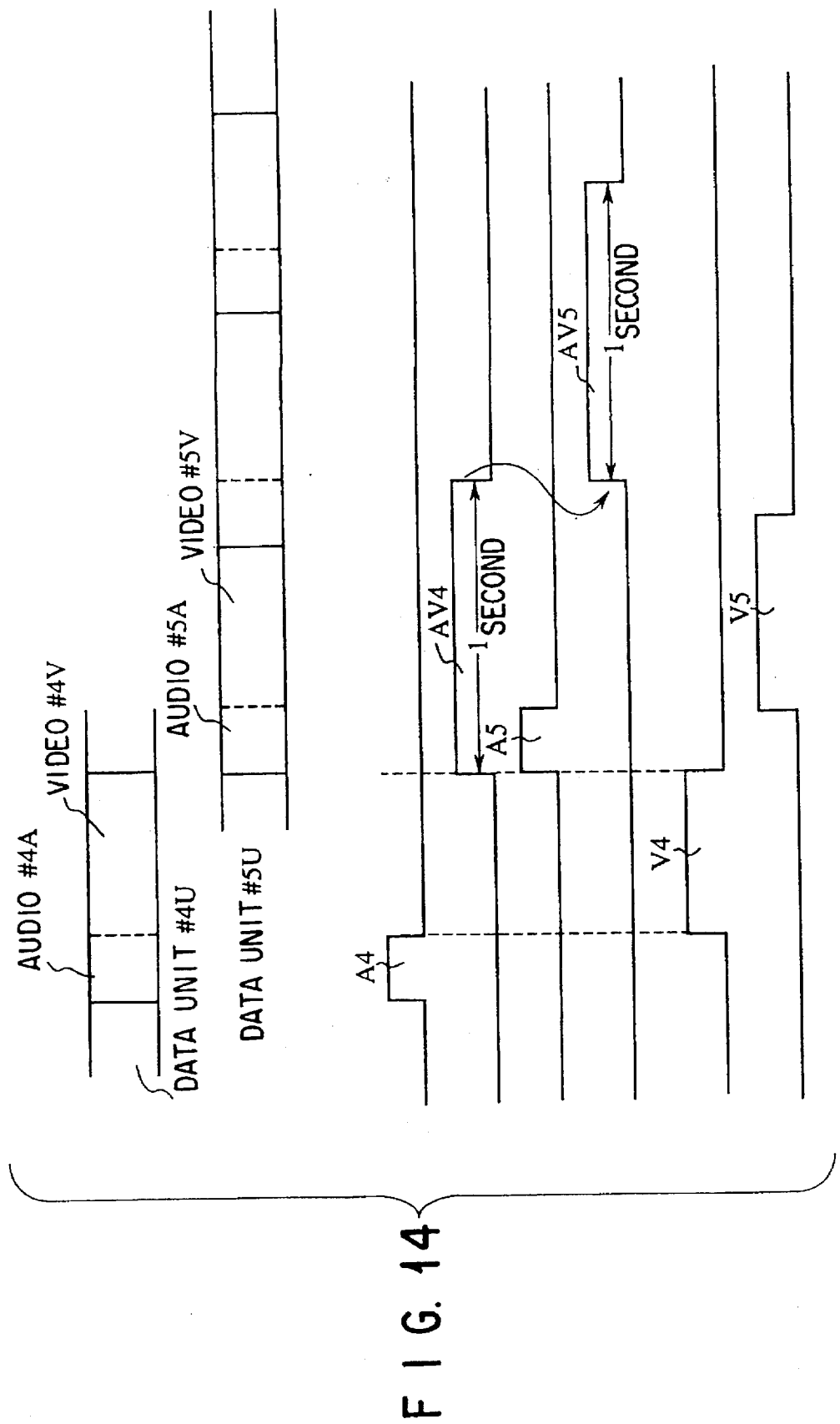
FIG. 14 is a diagram also explaining how the data reproducing apparatus switches scenes.

FIG. 14 is a timing chart for explaining a method of outputting audio or video information more easily after program bars representing simultaneously proceeding scenes have been switched, from one to another. In this method, a buffer memory is used to temporarily store the audio or video information read from the disk.

Illustrated in FIG. 14 are the nth-second data unit #4U in the program bar #4 shown in FIG. 13 and the nth-second data unit #5U in the program bar #5 shown in FIG. 13. Also shown in FIG. 14 are: the period A4 during which audio information #4A is read from the disk; the period A5 during which audio information #5A is read from the disk; the period V4 during which video information #V4 is read from the disk; and period V5 during which video information #5V is read from the disk. Further, shown in FIG. 14 are: the period AV4 during which the audio information A4 and the video information V4 are output from the data reproducing apparatus; and the period AV5 during which the audio information A5 and the video information V5 are output from the data reproducing apparatus. The buffer memory used to facilitate the outputting of audio information and video information has a storage capacity large enough to store at least the data unit #4U and the data unit #5U. Thus, the data unit #5U can be decoded after the data unit #4U has been decoded in its entirety. The audio information and the video information can thereby be reproduced without break, even if the program bars representing simultaneously proceeding scenes are switched, from one to another. If the data units #4U and #5U are part of a movie program, audio information items contained in these data units are preferably recorded so as to be reproduced without a time lag. In the above explanation, the time required to move the pickup is not taken into consideration.

As has been described with reference to FIG. 10, the disk may contain a parental consent code if the movie program recorded on that disk contains program bars representing simultaneously proceeding scenes, at least one of which should not be displayed to children.

The operation of the parental consent code will now be explained with reference to the flow chart of FIG. 15. First, when the disk is placed on a turntable and rotated, the management data, (i.e., VID, PIF and DAT), is read from the management area of the disk and subsequently stored into the work memory. Next, the data reproducing apparatus determines whether or not the management data contains a parental consent program (Steps S25 and S26). The step of determining this may be performed in various methods. One method is to detect the presence or absence of parental consent data in the sub-code of a data unit, either immediately after the disk has been placed on the turntable or while the data unit is being reproduced from the disk. Another method is to detect the presence or absence of a flag in the VID (see FIG. 8A), which has been set for a particular program movement (i.e., a story).

Figure 15:
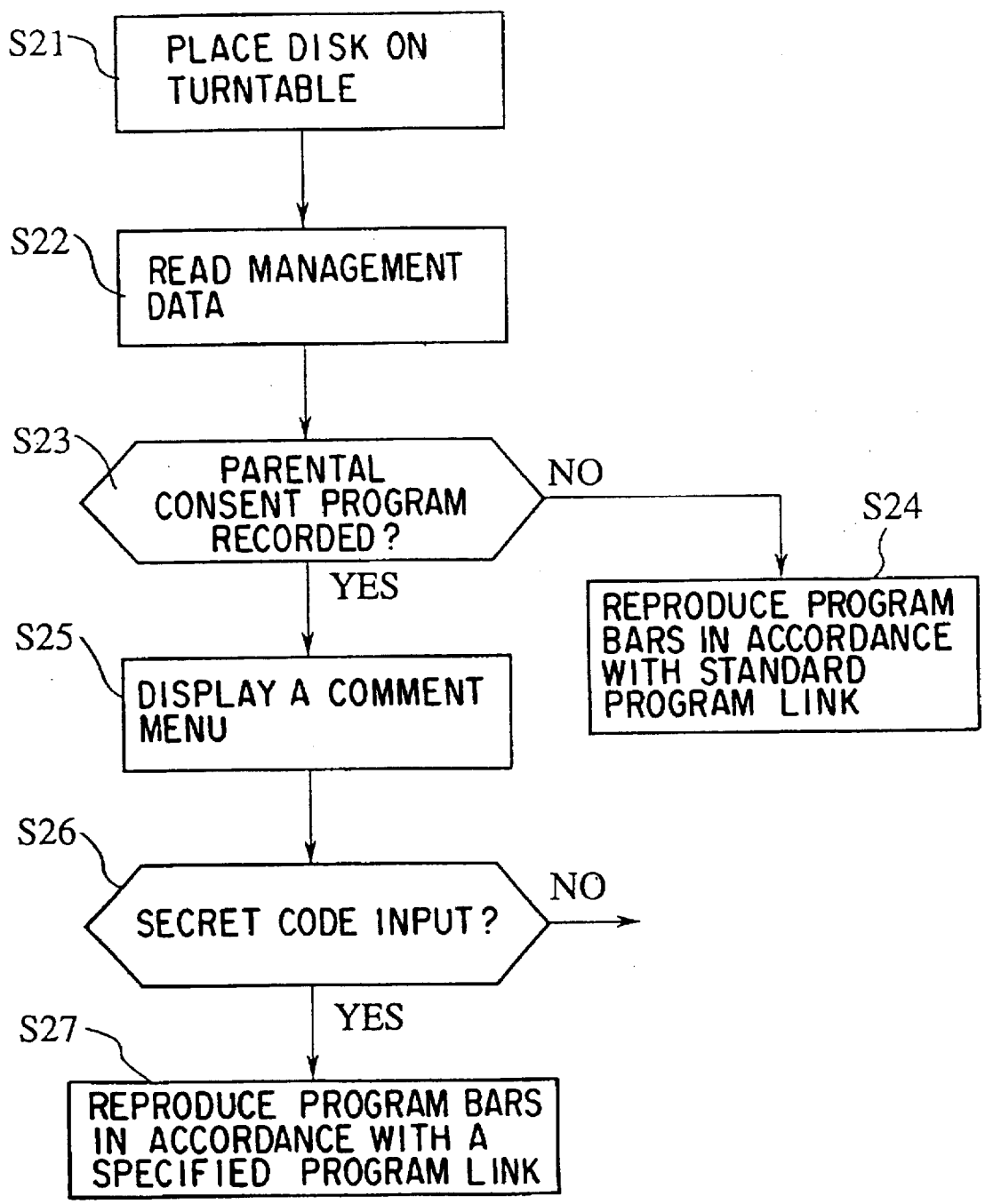
FIG. 15 is a flow chart for explaining an operation of the data reproducing apparatus.

In the case of FIG. 15, it is first determined whether or not a parental consent program has been recorded (Steps S21 to 23). If the management data contains no parental consent program, the program bars are reproduced from the disk in accordance with the standard program link (Step S24). If the management data contains a parental consent program, a menu of the type shown in FIG. 10B is displayed (Step S25). If the secret code known only to adult users has been input, the program bars are reproduced from the disk in accordance with a specified program link (Step S27).

Figure 16:
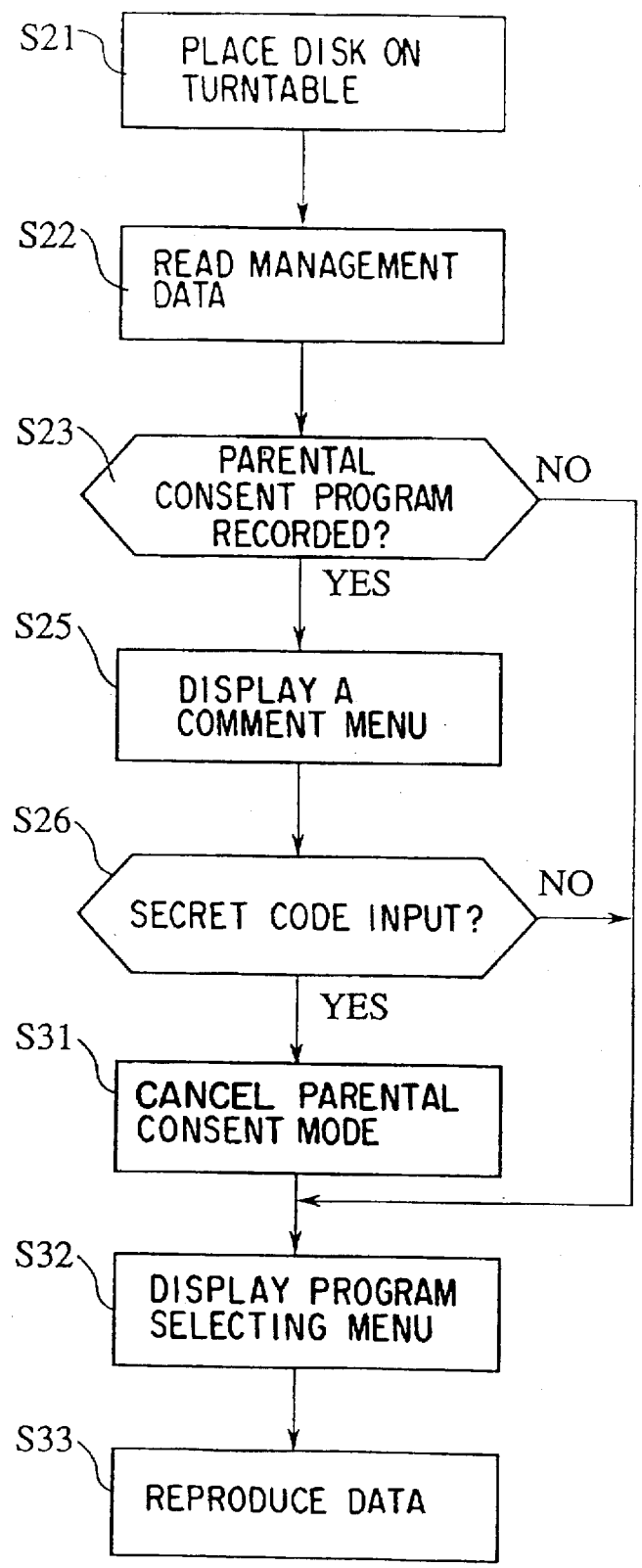
FIG. 16 is another flow chart for explaining an operation of the data reproducing apparatus.

An alternative operation of the parental consent code will now be explained with reference to the flow chart of FIG. 16. In FIG. 16, the steps identical to some of the steps illustrated in FIG. 15 are designated by the identical symbols. When there is no parental consent program, control goes to Step S32, in which a program select menu screen is displayed. When a parental consent program is present, a comment screen is displayed, and it is determined whether or not a secret code key has been pressed (Steps S25 and S26). If the secret code key has not been pressed, control proceeds to Step S32, in which a program select menu screen is displayed. If the secret code key has been pressed, the parental consent mode is canceled (Step S31) and control goes to Step S32. When the user has selected a program, a data string, or a story under the program select menu screen, a reproducing operation is performed according to the selection. When the parental consent mode has been canceled, for example, an image display process is achieved in a normal state without effecting the image display process showing in FIG. 10A.

When reproduced data strings of any program are controlled, the extension tables described above with reference to FIGS. 9B–9D and recorded as management data are useful.

FIG. 17 is a flow chart explaining how a monitor displays all simultaneously proceeding scenes recorded on the disk, one after another. First, the data is is read from the disk (Step S41). Then, a sub-code is read from the disk (Step S42). The sub-code contains a code (e.g., a parental consent code) which indicates the program information concerning program bars representing simultaneously proceeding scenes. Upon detecting this code, it is determined whether or the user has set a divided-frame display mode by operating the operator panel (Step S43).

If the divided-frame display mode has been set, existing linked program bars are displayed (Step S44). FIG. 18A shows a divided-frame menu which is displayed when four program bars #11, #12, #13 and #14 are linked to one another. FIG. 18B shows a divided-frame menu, displaying the program bars #11, #12, #13 and #14 in the form of ¼-sized bars #11', #12', #13' and #14'. In Step S44, the program bar #15 is reproduced, thereby displaying ¼-sized bars #11', #12', #13' and #14'.

If the divided-frame display mode is found not to have been set has been set in Step S43, the scene switching data is read from the disk (Step S45). Then, it is determined whether or not the scene switching data represents a scene enlarging mode (Step S46). If the scene switching data does not represent a scene enlarging mode, the flow goes to Step S44, in which multi-scene display is performed. If the scene switching data represents a scene enlarging mode, data for selecting a scene to be displayed in an enlarged form (e.g., data-string selecting data or story selecting data) is read from the disk, and the program bar representing the selected scene is reproduced from the disk, whereby the scene is displayed on the monitor in an enlarged form (Steps S48). When a disk contains a program as shown in FIG. 18B, a screen as shown in FIG. 18A appears when control has been passed from Step S43 or Step S46 to Step 44. Namely, the program bars #10, #15, #10, #16 . . . are reproduced in that order. When an enlarged screen has been specified, the reproduction of program bar #10 is followed by the reproduction of any one of #11, #12, #13, and #14 in a normal size. This is then followed by the reproduction of program bar #16.

In the embodiment described above, the program bar #15 has been recorded on the disk. Instead, to perform multi-scene display, the typical frames of the program bars #11, #12, #13 and #14, which represent simultaneously proceeding scenes, may be decoded, to form still pictures. These still pictures may be displayed on the monitor until it is determined that the scene switching data represents a scene enlarging mode. In this instance, the data reproducing apparatus needs to have additional video processing sections including decoders, and a circuit for processing the outputs from the decoders into reduced multi-scene video signals.

As has been described with reference to FIG. 2, recorded on the disk is a movie program which includes a plurality of data units, each containing, a plurality of audio information items representing speech in various languages among other things. Therefore the user can select one of the audio information strings or one of the video information strings. Thus, the data string processing section 203 (FIG. 1) can select an audio information item representing speech or a subtitle in a specific language.

If selection mode is set in the data reproducing apparatus, a decoder starts decoding the audio information in a data unit to be reproduced automatically when one scene is switched to another. The language selected at this time is identical to that used in the previously displayed scene.

In the embodiment described above, the parental consent code is obtained from the management data or a sub-code recorded on the disk. The parental consent code is used to set the data reproducing apparatus in the parental consent mode. The parental consent mode is cancelled as has been explained with reference to FIG. 16. In some case, however, the user may wish to set parental consent codes to all or some of the movie stories recorded on a disk he or she has bought.

FIG. 19 is a flow chart for explaining how the data recording apparatus operates when set in parental consent mode. First, the disk is placed on the turntable and rotated, and the management data is read (Steps S51 and S52). Then, it is determined whether or not the user has operated the operator panel by inputting a request for a parental consent code (Step S53). If no request has been input, the data reproducing apparatus is set into normal reproduction mode. If a request has been input, a menu is displayed based on a program link table (Step S54). This menu shows for example the ID numbers of information strings, such one as is illustrated in FIG. 7, for example. Next, the user looks at the the menu and operates the operator panel, thus inputting the ID number of the information string he or she has selected (Step S55). Then, such a menu as shown in FIG. 10B is displayed on the monitor, advising the user to input a parental consent code (Step S56). If the user inputs the parental consent code, the parental consent code, the the ID number of the selected information string, and the ID number of the disk, and the like are stored into the work memory in the form of a set of data.

As described above, while set in the parental consent mode, the data reproducing apparatus not only reads the management data from the disk when the disk is placed on the turntable, but also reads data from the work memory. Thereafter, the operation goes to Step S23 shown in FIGS. 15 and 16.

If the user has learned that the disk stores program bars representing simultaneously proceeding scenes, he may switch scenes at any time he or she want to. If the scene is not switched to the desired scene instantaneously, the user is likely to assume that the data reproducing apparatus has gone out of order, and that the appropriate one of the simultaneously proceeding scenes may not be reproduced. Having become rather restless, the user is likely to operate the panel repeatedly. To alleviate such anxiety the messages shown in FIG. 20 may be displayed on the monitor screen.

Figure 20A:
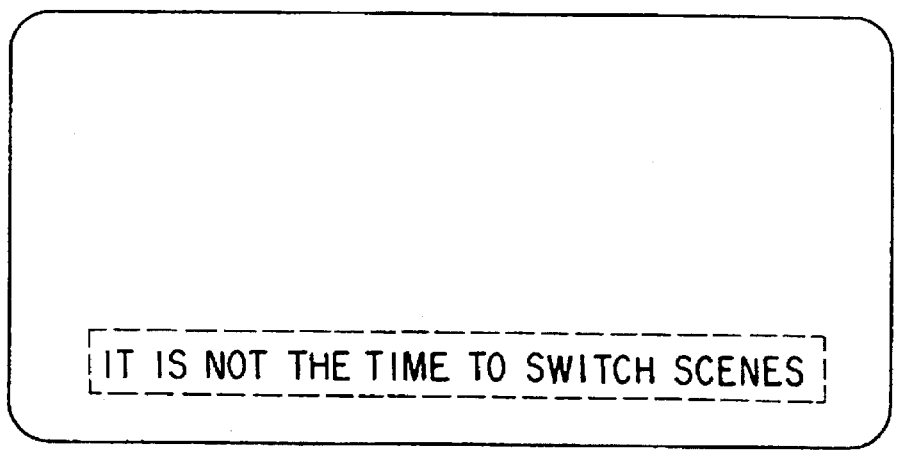
FIGS. 20A to 20C are diagrams showing examples of messages reproduced by the data reproducing apparatus.
Figure 20B:
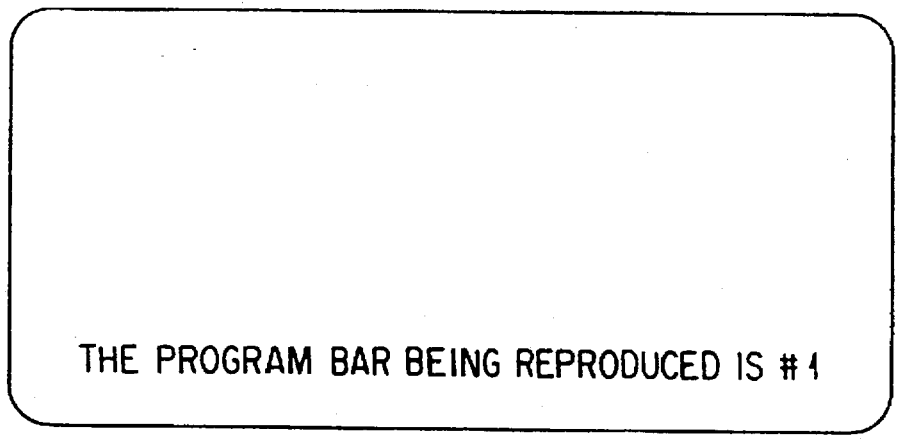
Figure 20C:
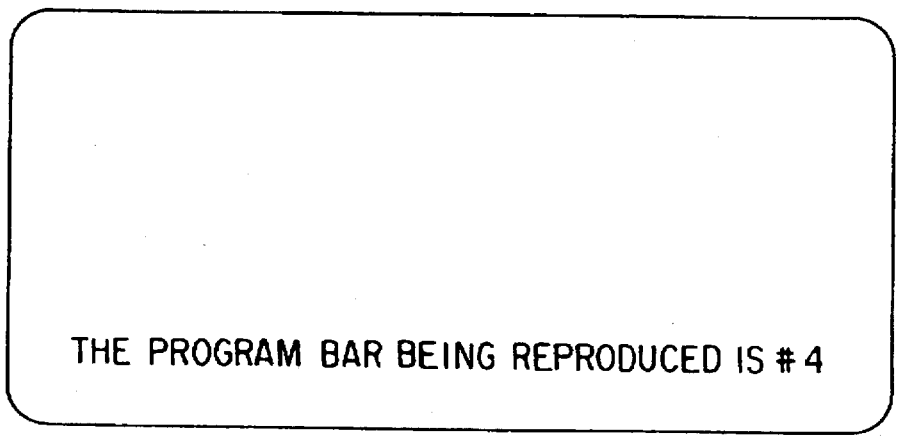

For instance, the moment the user operates the panel to switch the scenes represented by program bars linked in accordance with link information, (for example, those program bars shown in FIG. 3B), the monitor displays the message shown in FIG. 20A, "IT IS NOT THE TIME TO SWITCH SCENES". Alternatively, the moment the user operates the panel to switch simultaneously proceeding scenes from one to another, the monitor displays the message of FIG. 20B, "THE PROGRAM BAR BEING REPRODUCED IS #1" or the message of FIG. 20C, "THE PROGRAM BAR BEING REPRODUCED IS #4." Seeing such a message on the monitor screen, the user need not be irritated at all.

FIG. 21A illustrates another multi-scene program. The multi-scene program shown in FIG. 3B, for example, may be recorded in such a manner as illustrated in FIG. 21A. Namely, program bars #0, #1, #2, #1, #2, #1, #2, #3, #4, #5, #6, #4, #5, #6, #4, #5, #6, and #7 are arranged in this sequence. In other words, the program bar #0 is followed by program bars #1 and #2. On this disk, the program bars #1 and #2 are recorded in area TA. The program bars #4, #5 and #6 which follow the program bar #3 and which represent simultaneously proceeding scenes are recorded in a similar manner. In this case, the program bars representing simultaneously proceeding scenes are less in data amount than those shown in FIG. 3B. The disk 100 of this record format is accessed by a data reproducing apparatus of the type shown in FIG. 21B. This data reproducing apparatus is almost the same as the apparatus shown in FIG. 1, but differs in that the data string processing section 203 incorporates a buffer memory 230. The buffer memory 230 is provided for storing program bars which represent simultaneously proceeding scenes. For example, the data unit of program bars #1 and #2 are read and subsequently stored into the buffer memory 230 after program bar #0. Similarly, the data unit of program bars #4, #5 and #6 are read and subsequently stored into the buffer memory 230 after program bar #3. The program bars representing simultaneously proceeding scenes are sent to the video processing section 206. As a result, the monitor displays the scenes represented by these program bars at the same time, and generates sounds for these scenes. That is, multi-scene reproduction is achieved in real time. The program bars representing simultaneously proceeding scenes must be read from the disk at high speed.

To this end, the system control section 204 drives the motor 102 at high speed. If n program bars are recorded on the disk representing n simultaneously proceeding scenes, then the motor 102 is driven at a speed n times higher. Since the program is recorded in the format shown in FIG. 21A, the pickup means need not be moved back and forth in the radial direction of the disk.

Figure 22A:
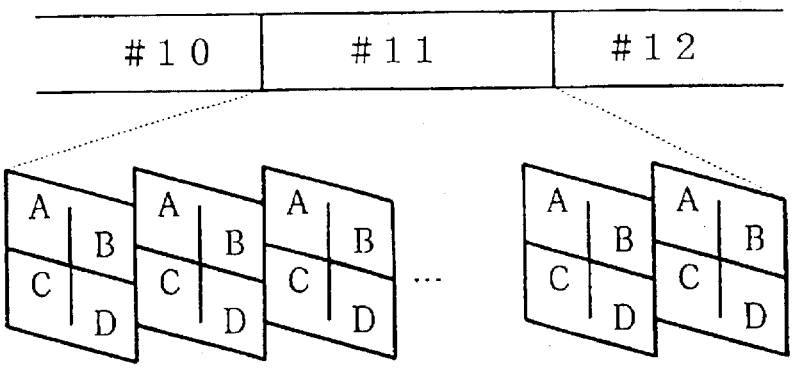
FIG. 22A shows another example of a data string recorded on the disk.
Figure 22B:
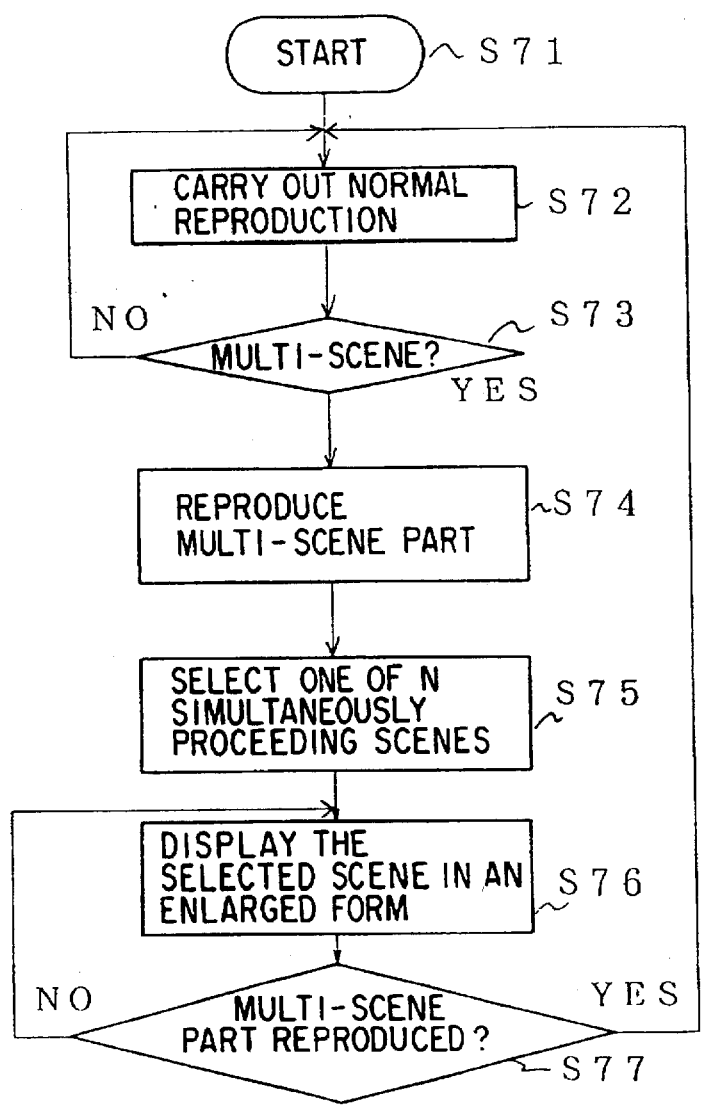
FIG. 22B is a flow chart for explaining how the data string is processed.

FIGS. 22A and 22B show another example of an arrangement of program bars which are recorded on a disk and which represent simultaneously proceeding scenes. In the case of this disk, four-scene information is recorded when the program bar #11 following the program bar #10 is reproduced. Four scenes A to D are illustrated in these figures. On the screen, the four scenes are simultaneously displayed in the form of moving pictures. Hence, the user can enjoy seeing the four scenes at the same time. While the multi-scene display is being performed, the user can select any one of the four scenes. When one of the four scenes is selected, it will be displayed in an enlarged size. FIG. 22B is a flow chart for explaining the software which is loaded in the data reproducing apparatus and which is designed to reproduce information from the disk. First, the data reproducing apparatus starts normal reproduction. If a multi-scene part is detected during the normal reproduction, a simultaneously proceeding scene is reproduced to be displayed on a part of the screen. That is, the program bar #11 shown in FIG. 22A is reproduced (Steps S71 to S74). If the user selects one of the simultaneously proceeding scenes being displayed, the data reproducing apparatus converts the selected program bar representing the selected scene to data which represents an enlarged scene. The selected scene is thereby displayed in an enlarged form. Upon completion of the reproduction of the multi-scene part, the apparatus will resume the normal reproduction (Steps S75 to S77).

Industrial Applicability

As has been described, the present invention can provide a multi-scene recording medium on which images are recorded together with speech and subtitle in various languages and which can therefore be used world-wide, and also a data reproducing apparatus which can reproduce data in various manners to meet various needs.

We claim:

1. An apparatus for reproducing information from a multi-scene recording medium including a disk having a management area and a data area, said data area recording a first program information item, a second program information item following said first program information item, a third program information item following said second program information item, and a fourth program information item for replacing the second program information item, said management area recording multi-scene configuration information indicating that said second and fourth program information items are linked to each other, said apparatus comprising:

pickup means for generating signals based on information recorded on said disk;

demodulation means for generating multi-scene configuration data by demodulating signals generated by said pickup means, said multi-scene configuration data being based on said multi-scene configuration information recorded in said management area of said disk;

management data storage means for storing said multi-scene configuration data generated by said demodulation means; and information reproducing means for freezing an image of a first data unit being decoded when scenes represented by said second program information item are switched in response to scene switching data that is input while said second program information item is being reproduced from said disk, and for decoding a second data unit based on said fourth program information which lasts for a same period as said first data unit when reproduced, wherein said information reproducing means comprises:

memory means for storing a number of first frames obtained by decoding said first data unit of said second program information item when said scene switching data is input;

frame-counting means for counting a number of second frames obtained by decoding said second data unit of said fourth program information item; and output means for supplying a decoded form of said second data unit to a monitor when a number of second frames counted by said frame-counting means becomes equal to a number of said first frames.

2. An apparatus for reproducing information from a multi-scene recording medium including a disk having a management area and a data area, said data area recording a first program information item, a second program information item following said first program information item, a third program information item following said second program information item, and a fourth program information item for replacing the second program information item, said second and fourth program information items each containing a relative address recorded at a start of the respective program information item, said management area recording multi-scene configuration information indicating that said second and fourth program information items are linked to each other, said apparatus comprising:

pickup means for generating signals based on information recorded on said disk;

demodulation means for generating multi-scene configuration data by demodulating signals generated by said pickup means, said multi-scene configuration data being based on said multi-scene configuration information recorded in said management area of said disk;

management data storage means for storing said multi-scene configuration data generated by said demodulation means;

information reproducing means for freezing an image of a first data unit being decoded when scenes represented by said second program information item are switched from one to another in response to scene switching data that is input while said second program information item is being reproduced from said disk, and for decoding a second data unit based on said fourth program information which lasts for a same period as said first data unit when reproduced; and control means for connecting said second and fourth program information items when said relative addresses coincide.

3. An apparatus according to claim 2, wherein said information reproducing means comprises:

memory means for storing a number of first frames obtained by decoding said first data unit of said second program information item when said scene switching data is input;

frame-counting means for counting a number of second frames obtained by decoding said second data unit of said fourth program information item; and output means for supplying a decoded form of said second data unit to a monitor when said number of second frames counted by said frame-counting means becomes equal to said number of said first frames.

4. A method of reproducing information from a multi-scene recording medium including a disk having a management area and a data area, said data area recording a first program information item, a second program information item following said first program information item, a third program information item following said second program information item, and a fourth program information item for replacing said second program information item, said management area recording multi-scene configuration information indicating that said second and fourth program information items are linked to each other, said method comprising the steps of:

reading information from said disk and generating pickup signals based on said information;

generating multi-scene configuration data by demodulating said pickup signals, said multi-scene configuration data being based on said multi-scene configuration information recorded in said management area of said disk;

storing said multi-scene configuration data;

freezing an image of a first data unit being decoded when scenes represented by said second program information item are switched from one to another in response to scene-switching data that is input while said second program information item is being reproduced from said disk, and decoding a second data unit based on said fourth program information item which lasts for a same period as said first data unit when reproduced;

storing a number of first frames obtained by decoding said first data unit of said second program information item when said scene-switching data is input;

counting second frames obtained by decoding said second data unit of said fourth program information item; and supplying a decoded form of said second data unit to a monitor when a number of second frames counted becomes equal to said number of first frames.

5. A method of reproducing information from a multi-scene recording medium according to claim 4, wherein said method also comprises the steps of:

storing a number of first frames obtained by decoding said first data unit of said second program information item when said scene-switching data is input;

counting second frames obtained by decoding said second data unit of said fourth program information item; and supplying a decoded form of said second data unit to a monitor when a number of second frames counted becomes equal to said number of first frames.

6. A method of reproducing information from a multi-scene recording medium including a disk having a management area and a data area, said data area recording a first program information item, a second program information item following said first program information item, a third program information item following said second program information item, and a fourth program information item for replacing said second program information item, said second and fourth program information items each containing a relative address recorded at a start of the respective program information item, said management area recording multi-scene configuration information indicating that said second and fourth program information items are linked to each other, said method comprising the steps of:

reading information from said disk and generating pickup signals based on said information;

generating multi-scene configuration data by demodulating said pickup signals, said multi-scene configuration data being based on said multi-scene configuration information recorded in said management area of said disk;

storing said multi-scene configuration data;

freezing an image of a first data unit being decoded when scenes represented by said second program information item are switched from one to another in response to scene-switching data that is input while said second program information item is being reproduced from said disk, and decoding a second data unit based on said fourth program information item which lasts for a same period as said first data unit when reproduced; and connecting said second and fourth program information items when said relative addresses coincide.

\* \* \* \* \*

UNITED STATES PATENT AND TRADEMARK OFFICE
CERTIFICATE OF CORRECTION

PATENT NO. : 5,675,695
DATED : October 7, 1997
INVENTOR(S) : Koichi Hirayama

It is certified that error appears in the above-identified patent and that said Letters Patent is hereby corrected as shown below:

Title page of the patent, section [62], "Division of Ser. No. 454,289, Jun. 15, 1995, Pat. No. 5,630,006" should be --Division of Ser. No. 454,289, filed as PCT/JP93/01570, Oct. 29, 1993, Pat. No. 5,630,006--.

Signed and Sealed this

Tenth Day of February, 1998

Attest:

BRUCE LEHMAN

Attesting Officer

Commissioner of Patents and Trademarks